US012457207B2

(12) United States Patent
Montgomery et al.

(10) Patent No.: US 12,457,207 B2
(45) Date of Patent: Oct. 28, 2025

(54) SYSTEMS AND METHODS FOR PHONE NUMBER CERTIFICATION AND VERIFICATION

(71) Applicant: Just One Technologies LLC, Charlottesville, VA (US)

(72) Inventors: Benjamin Montgomery, San Diego, CA (US); William W. Smith, Charlottesville, VA (US)

(73) Assignee: Just One Technologies LLC, Charlottesville, VA (US)

( * ) Notice: Subject to any disclaimer, the term of this patent is extended or adjusted under 35 U.S.C. 154(b) by 420 days.

(21) Appl. No.: 17/847,939

(22) Filed: Jun. 23, 2022

(65) Prior Publication Data

US 2022/0337580 A1 Oct. 20, 2022

Related U.S. Application Data

(62) Division of application No. 17/001,421, filed on Aug. 24, 2020, now abandoned.

(51) Int. Cl.
*H04L 29/06* (2006.01)
*H04L 9/32* (2006.01)
(Continued)

(52) U.S. Cl.
CPC ........ *H04L 63/0823* (2013.01); *H04L 9/3247* (2013.01); *H04M 3/42042* (2013.01); *H04M 3/436* (2013.01); *H04W 12/06* (2013.01)

(58) Field of Classification Search
CPC ... H04L 63/0823; H04L 9/3247; H04W 12/06
See application file for complete search history.

(56) References Cited

U.S. PATENT DOCUMENTS 6,792,531 B2 9/2004 Heiden et al.
7,779,250 B2 8/2010 Song et al.
(Continued)

OTHER PUBLICATIONS

Ivan Torroledo et al., Hunting Malicious TLS Certificates with Deep Neural Networks, Jan. 15, 2018, ACM, pp. 64-73. (Year: 2018).*
(Continued)

*Primary Examiner* — Luu T Pham
*Assistant Examiner* — Fahimeh Mohammadi
(74) *Attorney, Agent, or Firm* — WEAVER IP L.L.C.

(57) ABSTRACT

Methods, systems, apparatuses, and computer-readable storage mediums are described for issuing digital certificates to phone numbers and verifying phone numbers based on the digital certificates. For instance, a client may request from a certificate authority a digital certificate to be associated with the client's phone number. The certificate authority issues a phone number challenge to the client to verify that the request did in fact come from the client. The certificate authority signs and issues the digital certificate to the client responsive to a successful challenge. The digital certificates are utilized to exchange messages between a caller and call recipient to determine whether a phone number provided via CLI is accurate or inaccurate. Embodiments described herein determine whether the phone number is accurate using a process referred herein as positive CLI verification and determines whether the phone number is inaccurate using a process referred herein as negative CLI verification.

20 Claims, 9 Drawing Sheets

(51) Int. Cl.
*H04L 9/40* (2022.01)
*H04M 3/42* (2006.01)
*H04M 3/436* (2006.01)
*H04W 12/06* (2021.01)

(56) References Cited

U.S. PATENT DOCUMENTS

| | | | |
|---|---|---|---|
| 8,228,902 B2 | 7/2012 | Mehmood et al. | |
| 8,681,783 B2 | 3/2014 | Carney et al. | |
| 9,332,119 B1* | 5/2016 | Danis | H04M 3/42042 |
| 10,149,156 B1 | 12/2018 | Tiku et al. | |
| 10,374,809 B1* | 8/2019 | Dasarakothapalli | H04L 9/30 |
| 2002/0065828 A1* | 5/2002 | Goodspeed | G06F 16/9566 |
| | | | 707/E17.115 |
| 2006/0002556 A1 | 1/2006 | Paul | |
| 2007/0106612 A1* | 5/2007 | O'Brien | G06Q 20/40 |
| | | | 705/44 |
| 2007/0162742 A1* | 7/2007 | Song | H04L 63/0823 |
| | | | 713/156 |
| 2009/0046839 A1 | 2/2009 | Chow et al. | |
| 2010/0278322 A1* | 11/2010 | Krantz | H04M 3/382 |
| | | | 379/93.03 |
| 2015/0188712 A1* | 7/2015 | Teuwen | H04L 9/3236 |
| | | | 713/176 |
| 2017/0041463 A1* | 2/2017 | Yaung | H04M 3/42042 |
| 2018/0192290 A1* | 7/2018 | Soulez | H04M 3/42042 |
| 2018/0343251 A1* | 11/2018 | Voth | H04L 9/3213 |
| 2019/0036688 A1* | 1/2019 | Wasily | H04L 9/3231 |
| 2019/0213317 A1* | 7/2019 | Fujikawa | H04L 63/0823 |
| 2019/0220583 A1* | 7/2019 | Douglas | G06V 40/70 |
| 2020/0028690 A1* | 1/2020 | Barakat | H04L 9/3247 |
| 2020/0145528 A1* | 5/2020 | Lee | H04M 1/27453 |
| 2020/0389552 A1* | 12/2020 | Trim | H04W 12/61 |
| 2021/0075907 A1 | 3/2021 | Murphy et al. | |
| 2022/0060467 A1 | 2/2022 | Montgomery et al. | |

OTHER PUBLICATIONS

Arun Venkataramani et al., Design Requirements of a Global Name Service for a Mobility-Centric, Trustworthy Internetwork, Feb. 21, 2013, IEEE, pp. 1-9. (Year: 2013).*

Ahmad Sghaier Omar et al., Decentralized Identifiers and Verifiable Credentials for Smartphone Anticounterfeiting and Decentralized IMEI Database, Aug. 11, 2020, IEEE, vol. 43, Issue: 3, pp. 174-180. (Year: 2020).*

Lein Harn et al., Generalized Digital Certificate for User Authentication and Key Establishment for Secure Communications, Jul. 2011, IEEE, vol. 10, Issue: 7, pp. 2372-2379. (Year: 2011).*

Elwell, J., "Connected Identity in the Session Initiation Protocol (SIP)", RFC 4916, Jun. 2007, 24 pages.

Reaves, et al., "AuthentiCall: Efficient Identity and Content Authentication for Phone Calls", Proceedings of the 26th USENIX Security Symposium, Aug. 16-18, 2017, pp. 575-592.

Tu, et al., "Toward Standardization of Authenticated Caller ID Transmission", ITU Kaleidoscope, IEEE Communications Standards Magazine, Sep. 2017, pp. 30-36.

* cited by examiner

SYSTEMS AND METHODS FOR PHONE NUMBER CERTIFICATION AND VERIFICATION

CROSS-REFERENCE TO RELATED APPLICATION(S)

This application is a divisional of U.S. patent application Ser. No. 17/001,421, entitled "SYSTEMS AND METHODS FOR PHONE NUMBER CERTIFICATION AND VERIFICATION," and filed on Aug. 24, 2020, the entirety of which is incorporated by reference herein.

BACKGROUND

Digital certificates are powerful tools in cybersecurity, but currently require an issuance process which could be improved for some applications. Digital certificates are generally issued to an identified entity (e.g. a company, a website, a person, etc.). The Certificate Authority (CA) must perform some identity verification process, which is a difficult logistical problem. The certificate also contains the name of the entity, which identifies the user. This creates a privacy concern for individuals who wish to retain some level of anonymity. Certificates can be issued to a pseudonym, but a different problem arises. If a digital certificate is issued to an individual under a pseudonym, how does another user find the certificate? Unless the other user specifically knows the pseudonym used to register for the certificate it will be difficult to find the proper certificate.

Calling Line Identification ("CLI", also known as "Caller ID") "spoofing" is the act of modifying outgoing CLI on a telephone call. CLI spoofing has become a significant problem in the United States. Robocalls, spam calls, and scam calls are frequently made using spoofed CLI. The spoofed CLI makes holding malicious callers accountable difficult. By some estimates, these calls may make up to 25% of all telephone calls in the United States each year, with telephone scams and frauds costing Americans almost $10 billion annually. In this context CLI spoofing is clearly an issue, but CLI spoofing has legitimate uses as well. For example, companies frequently spoof the CLI of outgoing calls to show the company's mainline number, not the calling employee's specific line or extension.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described for issuing digital certificates to phone numbers and verifying phone numbers based on the digital certificates. For instance, a client may request from a certificate authority a digital certificate to be associated with the client's phone number. The certificate authority issues a phone number challenge to the client to verify that the request did in fact come from the client. The certificate authority signs and issues the digital certificate to the client responsive to a successful challenge. The digital certificates are utilized to exchange messages between a caller and call recipient to perform various operations, including, but not limited to, determining whether a phone number provided via CLI is accurate or inaccurate.

In a further aspect, the phone number is determined to be accurate using a process referred herein as positive CLI verification and determines whether the phone number is inaccurate using a process referred herein as negative CLI verification. When performing positive CLI verification, the caller's client sends a message, comprising his phone number and signed with his digital certificate, to the call recipient. Upon receiving the phone call, the call recipient's client compares the phone number extracted from the CLI and the phone number in the message. If the phone numbers match, the call recipient's client determines that the phone number included in the CLI is accurate. If the phone numbers do not match (or if no message is received from the caller), the call recipient's client switches to negative CLI verification. When performing negative CLI verification, the call recipient's client determines whether the phone number included in the CLI is associated with a digital certificate and, if so, sends a message to the certificate holder to verify that the certificate holder did not just make the telephone call. If the certificate holder confirms that no such call was made, then the call recipient determines that the incoming CLI is not accurate.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
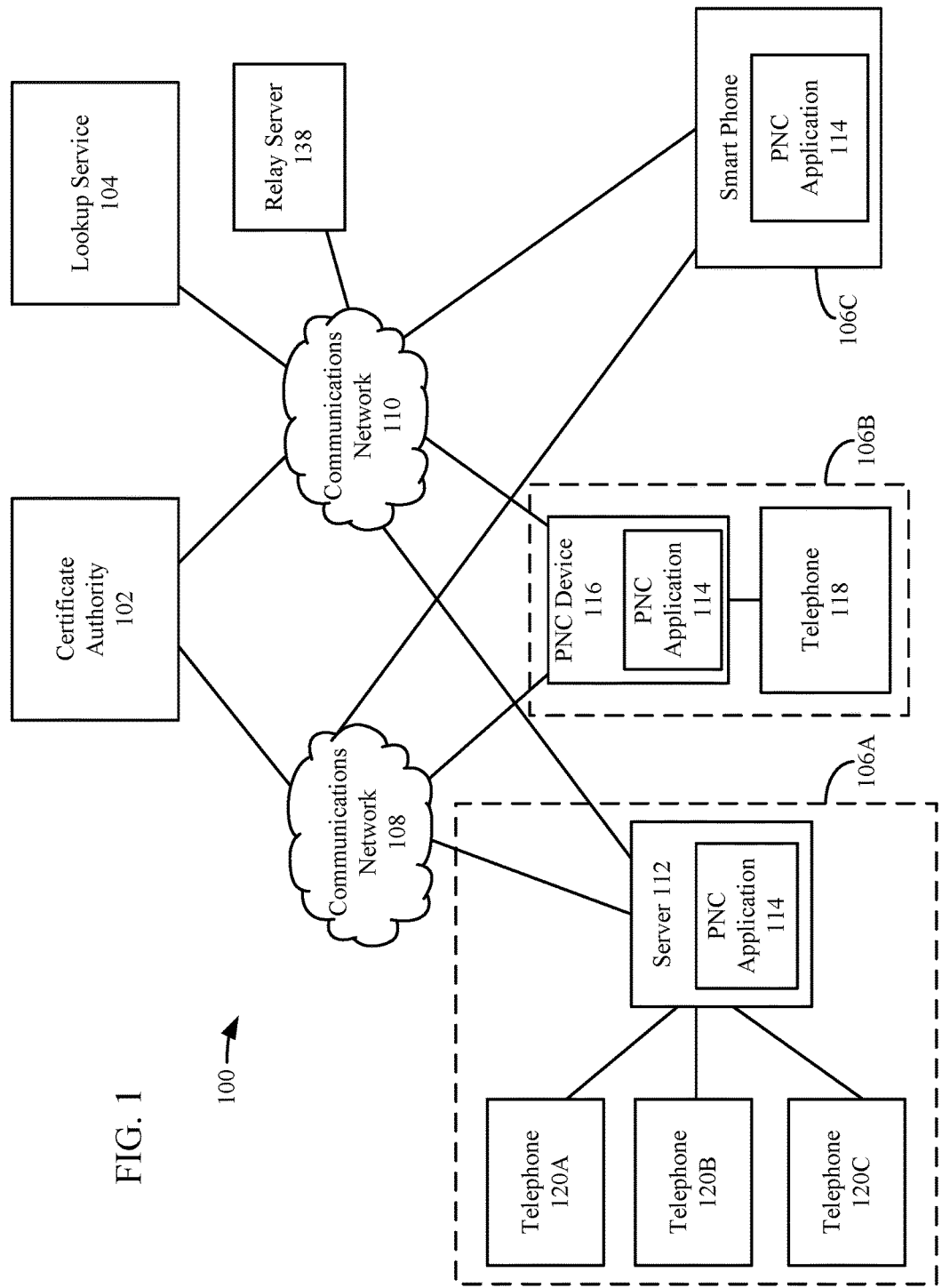
FIG. 1 shows a block diagram of a system for issuing a signed digital certificate for a phone number in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Phone numbers may belong to a variety of interacting entities such as individuals, companies, organizations, or government offices. The identity of the entity which owns a phone number is not generally public knowledge. However, a person's phone number is easily shared among friends, family, and other associations. For these reasons, phone numbers would make effective pseudonyms for digital certificates.

The embodiments described herein are directed to issuing digital certificates to phone numbers and verifying phone numbers based on the digital certificates. For instance, a client may request from a certificate authority a digital certificate to be associated with the client's phone number. The certificate authority issues a phone number challenge to the client to verify that the request did in fact come from the client. The certificate authority signs and issues the digital certificate to the client responsive to a successful challenge. The digital certificates are utilized to exchange messages between a caller and call recipient to perform various options, including, but not limited to, determining whether a phone number provided via CLI is accurate or inaccurate.

Embodiments described herein determine whether the phone number is accurate or inaccurate in various ways. For instance, a determination whether the phone number is accurate may be made using a process referred herein as positive CLI verification. A determination whether the phone number is inaccurate may be made using a process referred herein as negative CLI verification. For example, when performing positive CLI verification, the caller's client sends a message, comprising his phone number and signed with his digital certificate, to the call recipient. Upon receiving the phone call, the call recipient's client compares the phone number extracted from the CLI and the phone number in the message. If the phone numbers match, the call recipient's client determines that the phone number included in the CLI is accurate. If the phone numbers do not match (or if no message is received from the caller), the call recipient's client switches to negative CLI verification. When performing negative CLI verification, the call recipient's client determines whether the phone number included in the CLI is associated with a digital certificate and, if so, sends a message to the certificate holder to verify that the certificate holder did not just make the telephone call. If the certificate holder confirms that no such call was made, then the call recipient determines that the incoming CLI is not accurate.

The issued digital certificates advantageously allow peer-to-peer verification of an association with a phone number. An association might be that a person owns the phone number, works for the entity that owns the phone number, or is otherwise allowed to use the phone number. Users can digitally sign data to verify that they hold the certificate, which in turn verifies their association with the phone number. This creates the potential for a wide variety of new applications which utilize identification on the internet via phone numbers and offers several benefits over conventional certification systems.

For example, other certification systems issue certificates to specific domains, users, servers, or email addresses, but the embodiments described herein are unique in that IP-domain certificates are issued for non-IP domain phone numbers. Embodiments described herein are also configured such that the phone number is the only piece of identifying information. Other certification systems require all necessary identifying information to be included in the certificate information. Embodiments described herein do not require, or even allow, additional identifying information such as a personal name or company organization. That is, embodiments described herein do not require that personally identifying information be provided by or about the user. Yet, the embodiments described herein still provide important identification and security capabilities. Even though no other identifying information is included in the digital certificate, embodiments described herein allow users to be identified if an identity-phone number mapping is known. This would be the case if one user knew the phone number of a friend, or if a certificate was issued for the main phone line of a large company. The duality of this situation is helpful in some applications. For instance, the embodiments described herein are flexible enough to accommodate legitimate use cases where spoofing may be desired, such as a company which wants to set all outgoing calls to provide the CLI of a central company line.

Embodiments described herein also provide a lookup service that clients can use to retrieve certificate information about other clients and relay servers to send messages to and/or from callers and call recipients. The relay servers provide a statically addressable URI by which clients transmit and receive peer-to-peer messages to each other. The usage of the digital certificates allows clients to perform additional peer-to-peer functions such as verification (via digital signatures) and encryption. This improves security and privacy by allowing applications to remove centralized servers from these processes. That is, encryption may be configured for end-to-end use. This means that malicious entities cannot compromise the confidentiality of a message even if the lookup service or relay servers is/are compromised. Digital signatures also assure message recipients of the sender's identity and of the integrity of the message.

The embodiments described herein also do not require user accounts. Because the only piece of unique information is the phone number, which is verified during the phone number challenge, users do not need accounts to manage their certificates. This means that users do not specifically need to keep track of usernames or passwords to use systems which rely on digital certificates or the systems described herein. If a malicious entity compromises the system, no username or password data will be exposed.

Such embodiments are described in further detail as follows. Subsection A describes embodiments directed to issuing signed digital certificates for phone numbers. Subsection B describes embodiments directed to performing phone number verification.

A. Techniques for Issuing Signed Digital Certificates for Phone Numbers

FIG. 1 shows a block diagram of a system 100 for issuing a signed digital certificate for a phone number in accordance with an example embodiment. As shown in FIG. 1, system 100 includes a certificate authority 102, a lookup service 104, a relay server 138 and a plurality of clients 106A-106C. Each of clients 106A-106C are communicatively coupled to certificate authority 102 via first communications network 108 and a second communications network 110. Clients 106A-106C, certificate authority 102, lookup service 104, and relay server 138 are communicatively coupled via second communications network 110. First communication network 108 may comprise one or more networks, such as, but not limited to, a landline network (e.g., a public switched telephone network), a cellular or mobile network, and/or any network that enables communication with a client device (e.g., clients 106A-106C) via a telephone number assigned thereto. Second communications network 110 may comprise one or more networks such as local area networks (LANs), wide area networks (WANs), enterprise networks, the Internet, etc., and may include one or more of wired and/or wireless portions.

Client 106A may comprise an enterprise or other business entity. Client 106A comprises a server 112 and a plurality of telephone devices 120A-120C coupled thereto. Server 112 and telephone devices 120A-120C may be included as part of a private branch eXchange (PBX) telephone system that accommodates multiple incoming phone calls to a common phone number that are routed to different telephone devices of telephone devices 120A-120C. For instance, server 112 may comprise switching logic configured to receive incoming phone calls and route the calls to different ones of telephone devices 120A-120C. Server 112 is communicatively coupled to communications network 108 and/or communications network 110. Server 112 may be communicatively coupled to communications network 108 via a RJ11 cable or any interface suitable for coupling server 112 to a landline network. Server 112 may be communicatively coupled to communications network 110 via an Ethernet interface or WiFi interface, although these are only examples. Telephone devices 120A-120C may be similarly coupled to server 112 via a RJ11 cable, although the embodiments described herein are not so limited.

In an embodiment, the PBX may be implemented as a Voice over Internet Protocol (VoIP)-based PBX. In accordance with such an embodiment, server 112 is configured to receive telephony services via a VoIP connection. The VoIP connection may be implemented, for example, over a broadband data service such as Digital Subscriber Line (DSL), Integrated Services Digital Network (IDSN), data over cable, T1/T3, optical carrier, carrier-class Ethernet, satellite or any other suitable data service. The various physical transport media used for implementing such data services are well known. In one embodiment, server 112 connects to the appropriate data service via an Ethernet interface or WiFi interface, although these are only examples. Similarly, each of telephone devices 120A-120C may be coupled to server 112 via an Ethernet interface or WiFi interface.

Client 106B may comprise a telephone device 118 and a phone number certification (PNC) device 116. PNC device 116 is configured to be coupled to communications network 108 and/or communications network 110. PNC device 116 may be communicatively coupled to communications network 108 via a RJ11 cable or any interface suitable for coupling PNC device 116 to a landline network. PNC device 116 may be communicatively coupled to communications network 110 via an Ethernet interface or WiFi interface, although these are only examples. Telephone device 118 may be similarly coupled to standalone device via a RJ11 cable.

In accordance with an embodiment, client 106B is configured to receive telephony services via a VoIP connection. In one embodiment, PNC device 116 and/or telephone device 118 connects to the appropriate data service made available through communications network 110 via an Ethernet interface or WiFi interface, although these are only examples. Similarly, telephone device 118 may be coupled to PNC device 116 via an Ethernet interface or WiFi interface.

Client 106C may comprise a smart phone communicatively coupled to communications network 108 and communications network 110. Client 106C is coupled to communications network 108 and communications network 110 via one or more wireless modems. The modem(s) can include a cellular modem for communicating with the mobile communication network (e.g., communications network 108) and/or other radio-based modems for communicating via other wireless networks, such as communications network 110. The cellular modem may be configured to enable phone calls (and optionally transmit data) according to any suitable communication standard or technology, such as GSM (Global System for Mobile Communications), 3G (third-generation), 4G (fourth-generation), 5G (fifth-generation), etc. At least one of the wireless modem(s) is typically configured for communication with one or more cellular networks, such as a GSM network for data and voice communications within a single or multiple cellular networks (e.g., communications network 108), or between the smart phone and a public switched telephone network (PSTN) (e.g., communications network 110).

As also shown in FIG. 1, server 112, PNC device 116, and smart phone 106C comprise a PNC application 114. PNC application 114 is configured to provide an initial request for a signed digital certificate to certificate authority 102. The request may comprise a public key associated with the phone number of the client from which the request originates (e.g., clients 106A-106C) and the phone number of the client. The request may further specify a phone number verification process to be utilized to verify that the initial request originated from the owner of the client. The request is provided via communications network 110. It is noted that a client may be associated with a plurality of different phone numbers. In such a case, the client may request a signed digital certificate for each of the phone numbers. For instance, the client may issue an initial request for each phone number, where the request includes a particular public key associated with a particular phone number associated with the client, the phone number, and/or phone number verification process. Alternatively, the client may issue a single initial request comprising the plurality of public keys, phone numbers and/or phone number verification processes.

Certificate authority 102 is configured to issue a phone number challenge in accordance with the phone number verification process, for example, specified by a particular received request. For instance, certificate authority 102 may provide a phone number verification request that specifies a verification code. The phone number verification request is provided to the requesting client via communications network 108. Upon receiving the verification code, the user may enter the code via PNC application 114. For instance, PNC application 114 may comprise a user interface configured to receive user input. The user may provide the verification code as user input using the user interface. Responsive to receiving the verification code, PNC application 114 provides the verification code to certificate authority 102 via a response. The response is provided to certificate authority 102 via communications network 110.

Certificate authority 102 is configured to verify if the received verification code matches the verification code provided to the requesting client. If the code matches, then certificate authority 102 determines that the initial request originated from the owner of the phone number specified by the initial request and generates and signs the certificate with a digital signature. The certificate comprises the phone number of the requesting client for which the certificate was generated and the public key associated with that phone number. Certificate authority 102 provides the signed digital certificate to the requesting client via communications network 110. Certificate authority 102 also provides the signed digital certificate to lookup service 104.

If the code does not match, then certificate authority 102 determines that the initial request did not originate from the owner of the phone number specified by the initial request and does not generate the certificate.

Lookup service 104 stores the signed digital certificate(s) in data storage maintained thereby. Lookup service 104 maintains an association between the signed digital certificate(s) and the respective phone numbers for which the signed certificate(s) were issued. Lookup service 104 enables the signed digital certificate(s) to be made available (e.g., looked up) by requesting entities. For instance, a requesting entity may provide a request for a digital certificate. The request may specify a phone number. Lookup service 104 determines whether it maintains a digital certificate that is associated with the specified phone number. Responsive to determining that such a digital certificate is maintained thereby, lookup service 104 provides the digital certificate to the requesting entity.

Certificate authority 102 also registers the requesting client with relay server 138. For instance, certificate authority 102 may send a request to relay server 138 via communications network 110. Responsive to receiving the request, relay server 138 may allocate a static (or statically-addressable) uniform resource identifier (URI) for the requesting client. The statically-addressable URI may be an Internet protocol (IP) address. Relay server 138 may provide a response to certificate authority 102 that indicates that a URI has been allocated for the requesting client. Certificate authority 102 may provide the URI, along with the signed digital certificate, to lookup service 104. Alternatively, relay server 138 may provide the URI directly to lookup service 104. It is noted that any number of relay servers may be utilized for any number of clients.

In accordance with an embodiment, the initial request provided by the requesting client specifies the URI of relay server 138, and certificate authority 102 may provide the URI to lookup service 204. In accordance with another embodiment, responsive to receiving the initial request comprising the URI, certificate authority 102 may send a request to relay server 138 comprising the URI to verify and/or allocate the URI. Relay server 138 allocates the specified URI and sends a response to certificate authority 102 accordingly.

When generating the digital certificate, certificate authority 102 may also include the URI of relay server 238 in the digital certificate.

It is noted that each of certificate authority 102 and lookup service 104 may be implemented via a computing device, such a server. In accordance with an embodiment, certificate authority 102 and lookup service 104 are implemented by the same server. In accordance with another embodiment, certificate authority 102 and lookup service 104 are implemented in different servers. In accordance with yet another embodiment, certificate authority 102 and/or lookup service 104 are implemented in relay server 138. It is further noted that while FIG. 1 shows three clients 106A-106C and three telephone devices 120A-120C for client 106A, system 100 may comprise any number of clients and telephone devices for client 106A.

It is further noted that while FIG. 1 depicts each of clients 106A-106C comprising PNC application 114, each of clients 106A-106C may comprise its own version of PNC application 114. For instance, PNC application 114 of client 106A may be configured for execution on server 112, PNC application 114 of client 106B may be configured for execution on PNC device 116, and PNC application 114 of client 106C may be configured for execution on smart phone 106C.

Figure 2:
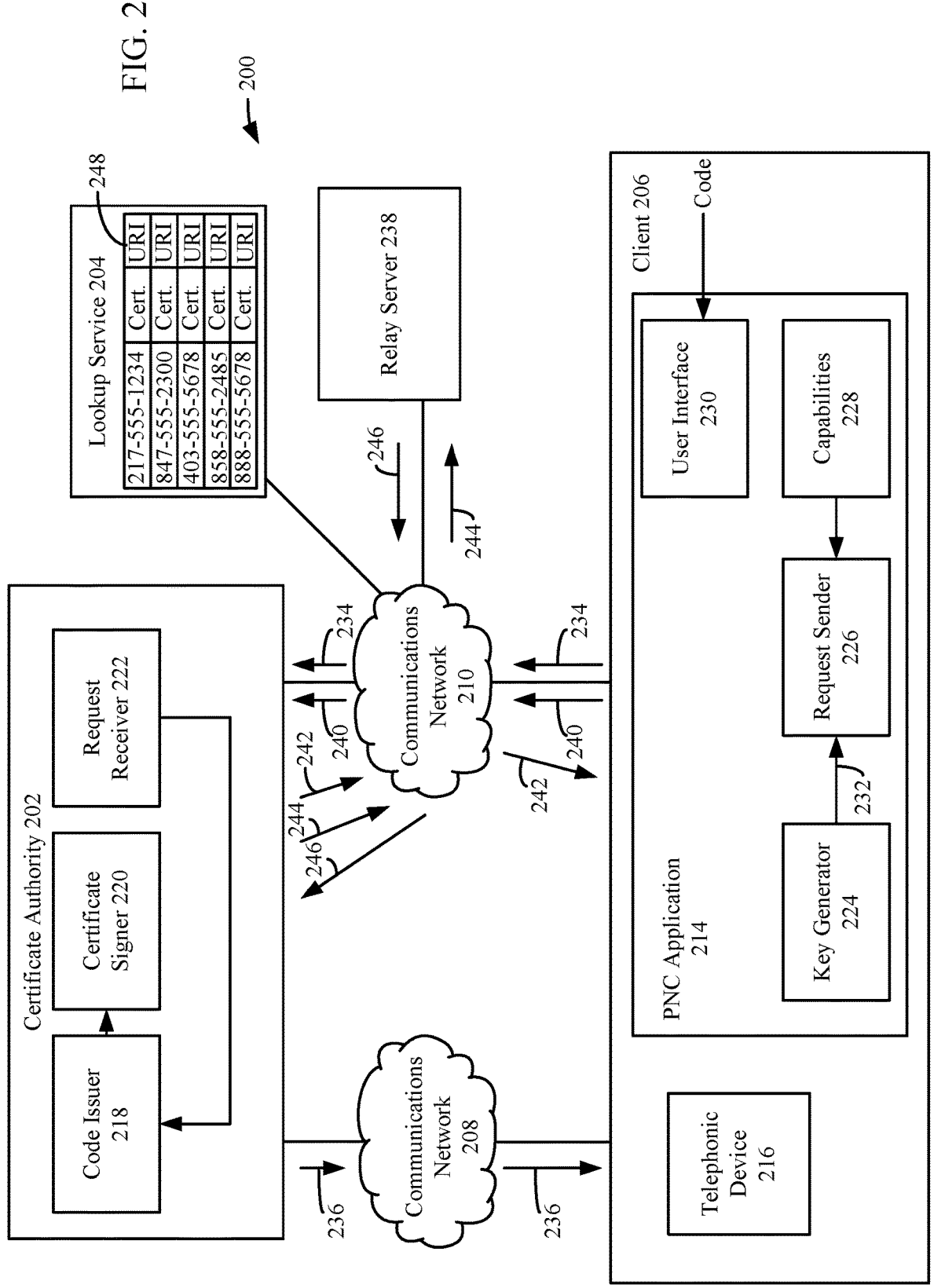
FIG. 2 shows a block diagram of another system for issuing a signed digital certificate for a phone number in accordance with another example embodiment.

FIG. 2 shows a block diagram of a system 200 for issuing a signed digital certificate for a phone number in accordance with another example embodiment. As shown in FIG. 2, system 200 comprises a certificate authority 202, a lookup service 204, a relay server 238, a PNC application 214, and a client 206. Certificate authority 202 is communicatively coupled to client 206 via communications network 208 and/or communications network 210. Client 206, certificate authority 202, lookup service 204, and/or relay server 238 are communicatively coupled via communications network 210. Certificate authority 202 is an example of certificate authority 102, lookup service 204 is an example of lookup service 104, relay server 238 is an example of relay server 138, client 206 is an example of any of clients 106A-106C, communications network 208 is an example of communications network 108, and communications network 210 is an example of communications network 110, as respectively described above with reference to FIG. 1.

Client 206 comprises a telephonic device 216 (e.g., telephones 120A-120C, telephone 118, smart phone 106C, as described above with reference to FIG. 1) and PNC application 214. PNC application 214 may be incorporated in telephonic device 216, for example, in an embodiment in which telephonic device 216 is a smart phone. Alternatively, PNC application 214 is incorporated in a device other than telephonic device 216. For instance, PNC application 214 may be incorporated in a device (e.g., PNC device 116 or server 112, as shown in FIG. 1) communicatively coupled to telephone device 216.

Certificate authority 202 comprises a code issuer 218, a certificate signer 220, and a request receiver 222. PNC application 214 comprises a key generator 224, a request sender 226, and a user interface 230. PNC application 214 also maintains one or more capabilities 228 that are supported by telephonic device 216 and/or characteristics thereof. For instance, capabilities 228 may comprise an identifier of a phone number verification process supported by telephonic device 216. Capabilities 228 may also comprise the phone number associated with telephonic device 216. Capabilities 228 may be determined via an automated discovery process between PNC application 214 and telephonic device 216. Alternatively, capabilities 228 may be user-specified.

Key generator 224 is configured to generate a private/public key pair. Key generator 224 may be configured to generate a private/public key pair for each phone number associated with client 206. Key generator 224 may generate the private/public key pair(s) in accordance with any technique known in the art, including, but not limited to, a Rivest-Shamir-Adleman (RSA) encryption-based techniques, ElGamal encryption-based techniques, Digital Signature Standard (DSS) encryption-based techniques, etc. PNC application 214 stores the private key locally on the device on which PNC application 214 executes. The public key(s) (shown as public key(s) 232) and/or private key(s) are provided to request sender 226.

Request sender 226 is configured to receive public key(s) 232 and retrieve capabilities and/or characteristics of telephonic device 216, such as the identifier of the phone number verification process(es) supported by telephonic device 216 and phone number(s) associated with telephonic device 216. Request sender 226 generates an initial request 234 for a signed digital certificate for a particular phone number associated with client 206 and provides initial request 234 to certificate authority 202 via communications network 210. In accordance with an embodiment, request sender 226 may encrypt or sign initial request 234 utilizing the private key associated with the phone number. Initial request 234 comprises the public key(s) and the phone number(s) associated with telephonic device 216. In accordance with an embodiment, initial request 234 may further comprise the phone number verification process identifier(s). In accordance with another embodiment, initial request 234 comprises a URI of relay server 238. In accordance with another embodiment, the phone number verification process identifier(s) and/or URI of relay server 238 are not included in initial request 234 and is provided separately to certificate authority 202, e.g., via another request.

In accordance with an embodiment in which PNC application 214 executes on a server (e.g., server 112) or a PNC device (PNC device 116), request 234 may be provided via an Ethernet interface, WiFi interface, and/or the like of such devices. In accordance with an embodiment PNC application 214 executes on smart phone (e.g., client 106C), request 234 may be provided via a wireless modem of the smart phone.

Request receiver 222 of certificate authority 202 is configured to receive request 234 via communications network 210, for example, via a wired or wireless network interface. In accordance with an embodiment, request receiver 222 analyzes initial request 234 to determine the request sender's phone number(s), phone number verification process identifier(s), and/or the URI of relay server 238. In accordance with another embodiment, request 234 may not specify the phone number verification process, and request receiver 222 infers the phone number verification process based on how request 234 is received. For instance, certificate authority 202 may be configured to receive requests from client 206 via different URIs associated with certificate authority 202, where each URI is mapped to a different phone number verification process. Accordingly, if a request from client 206 is received via a first URI, request receiver 222 determines that the phone number verification process is the process associated with the first URI. Similarly, if a request from client 206 is received via a second URI, request receiver 222 determines that the phone number verification process is the process associated with the second URI.

Request receiver 222 provides the determined phone number(s) and phone number verification process identifier(s) to code issuer 218. Code issuer 218 is configured to issue a phone number verification challenge to the determined phone number(s) in accordance with the phone number verification process(es) identified by the indicator.

The aim of the phone number verification challenge is to confirm that the received initial request 234 originates from the owner of the phone number(s). If certificate authority 202 is able to send data to a client associated with the phone number(s) and receives the same data back from the client requesting the signed certificate, then it is confirmed that the phone number(s) are used by that client and initial request 234 is valid.

The phone number verification process identifier(s) specify a particular phone number verification process from a plurality of phone number verification processes that is supported by client 206. Examples of phone number verification processes include, but are not limited to a short message service (SMS)-based verification process, an audio code-based verification process, or an automated audio code-based verification process.

When using an SMS-based verification process, code issuer 218 provides a request 236 comprising a SMS-based text message to telephonic device 216. The SMS-based text message comprises a code (e.g., a numeric or alphanumeric code) to the phone number associated with telephonic device 216 via communications network 208. Such a verification process is suitable in embodiments in which client 206 comprises a smart phone capable of receiving SMS text messages. In accordance with such embodiments, responsive to receiving the code, the user of client 206 inputs the code via user interface 230. User interface 230 may comprise a graphical user interface that enables the user to enter the received code. In accordance with another embodiment, PNC application 214 accesses the SMS text messages of client 206 automatically to retrieve the code without user input. PNC application 214 provides a phone number verification response 240 comprising the received code to certificate authority 202 via communications network 210. It is noted that the PNC application 214 may include the public key in response 240 in addition to or in lieu of providing public key in initial request 234.

When using an audio code-based verification process, code issuer 218 places a telephone call to telephonic device 216 via communications network 208 in accordance with the phone number received from PNC application 214. When the user accepts the phone call, code issuer 218 provides (e.g., plays back) a human-comprehensible audio code during the phone call. Such a verification process is suitable in embodiments in which client 206 comprises a landline phone (as shown via client 106B in FIG. 1) or a smart phone (as shown via client 106C in FIG. 1). In accordance with such embodiments, responsive to hearing the code, the user of client 206 inputs the code via user interface 230. In accordance with an embodiment in which telephonic device 216 is a landline phone coupled to a PNC device (e.g., PNC device 116), user interface 230 may comprise one or more physical buttons and/or a graphical user interface that enables the user to enter the received code. The PNC device may further comprise a display screen configured to display the code entered in by the user. PNC application 214 provides response 240 comprising the received code to certificate authority 202 via communications network 210.

When using an automated audio code-based verification process, code issuer 218 places a telephone call to telephonic device 216 via communications network 208 in accordance with the phone number received from PNC application 214. Such a verification process is suitable in embodiments in which client 206 comprises an enterprise or business entity (as shown via client 106A in FIG. 1) that utilizes an enterprise or PBX telephone system in which the telephone system is heavily automated, but unable to receive SMS messages. In accordance with such embodiments, server 112 accepts the phone call, and code issuer 218 provides (e.g., plays back) a machine-comprehensible audio code (e.g., a dual tone multi frequency (DTMF)-based code) during the phone call. PNC application 214 (executing on server 112) receives the phone call, determines the machine-comprehensible audio code, and provides response 240 comprising the determined code to certificate authority 202 via communications network 210.

Code issuer 218 is configured to receive response 240 and verify if the received verification code matches the verification code provided to client 206. If the code matches, then code issuer 218 determines that initial request 234 originated from the owner of the phone number specified by initial request 234 and provides an indication to certificate signer 220 to generate and sign the certificate with a digital signature.

Certificate signer 220 generates and signs the digital certificate and provides a response 242 comprising the signed digital certificate to client 206 via communications network 210. The signed digital certificate comprises the public key and the phone number specified by initial request 234. Certificate signer 220 also provides the signed digital certificate to lookup service 204 via communications network 210. In an embodiment in which client 206 comprises an enterprise or business entity (as shown via client 106A in FIG. 1), the signed digital certificate is stored in data storage maintained by server 112. In accordance with such an embodiment, each telephone device coupled to server 112 (e.g., telephones 120A-120C) may share the same signed digital certificate, although the embodiments described herein are not so limited. In an embodiment in which client 206 comprises a landline phone (as shown via client 106B in FIG. 1), the private key generated by key generator 224 and the signed digital certificate are stored in data storage maintained by PNC device 116. In an embodiment in which client 206 comprises a smart phone (as shown via client 106C in FIG. 1), the private key generated by key generator 224 and the signed digital certificate are stored in data storage maintained by the smart phone.

Certificate signer 220 may also register client 206 with relay server 238. For instance, certificate signer 220 may send a request 244 to relay server 238 via communications network 210. Responsive to receiving request 244, relay server 238 may allocate a statically-addressable uniform resource identifier (URI) for client 206. The statically-addressable URI may be an Internet protocol (IP) address. Relay server 238 may provide a response 246 to certificate signer 220 that indicates that a URI has been allocated for client 206. Certificate signer 220 may provide the URI, along with the signed digital certificate, to lookup service 204. Alternatively, relay server 238 may provide the URI directly to lookup service 204. It is noted that any number of relay servers may be utilized for any number of clients. That is, clients may be distributed across a plurality of different relay servers. Thus, any downtime associated with a particular relay server (e.g., due to a malicious attack) would only affect the clients associated with that server, whereas clients associated with other relay servers that were not attacked would not be affected.

In accordance with an embodiment, initial request 234 provided by PNC application 214 client specifies the URI of relay server 238, and certificate authority 202 may provide the URI to lookup service 204. In accordance with another embodiment, responsive to receiving initial request 234 comprising the URI, certificate authority 202 may send a request to relay server 238 comprising the URI to verify and/or allocate the URI. Relay server 238 allocates the specified URI and sends a response to certificate authority 202 accordingly.

When generating the digital certificate, certificate signer 220 may also include the URI of relay server 238 in the digital certificate.

If the code does not match, then code issuer 218 determines that initial request 234 did not originate from the owner of the phone number specified by initial request 234 and does not generate the digital certificate.

Lookup service 204 is configured to store signed digital certificates associated with different phone numbers. The signed digital certificates are stored in a data storage maintained thereby. Lookup service 204 maintains an association between each signed digital certificate, the phone number for which the signed certificate was issued, and the URI allocated therefor. The association may be maintained via a data structure 248, such, but not limited to, a table. Lookup service 204 enables the signed digital certificate and the URI to be made available (e.g., looked up) by requesting entities. For instance, a requesting entity may provide a request for a digital certificate and/or the URI for a particular phone number. The request may specify the phone number. Lookup service 204 determines whether it maintains a digital certificate and/or URI that is associated with the specified phone number. Responsive to determining that such a digital certificate and/or URI is maintained thereby, lookup service 204 provides the digital certificate and/or URI to the requesting entity.

Figure 3:
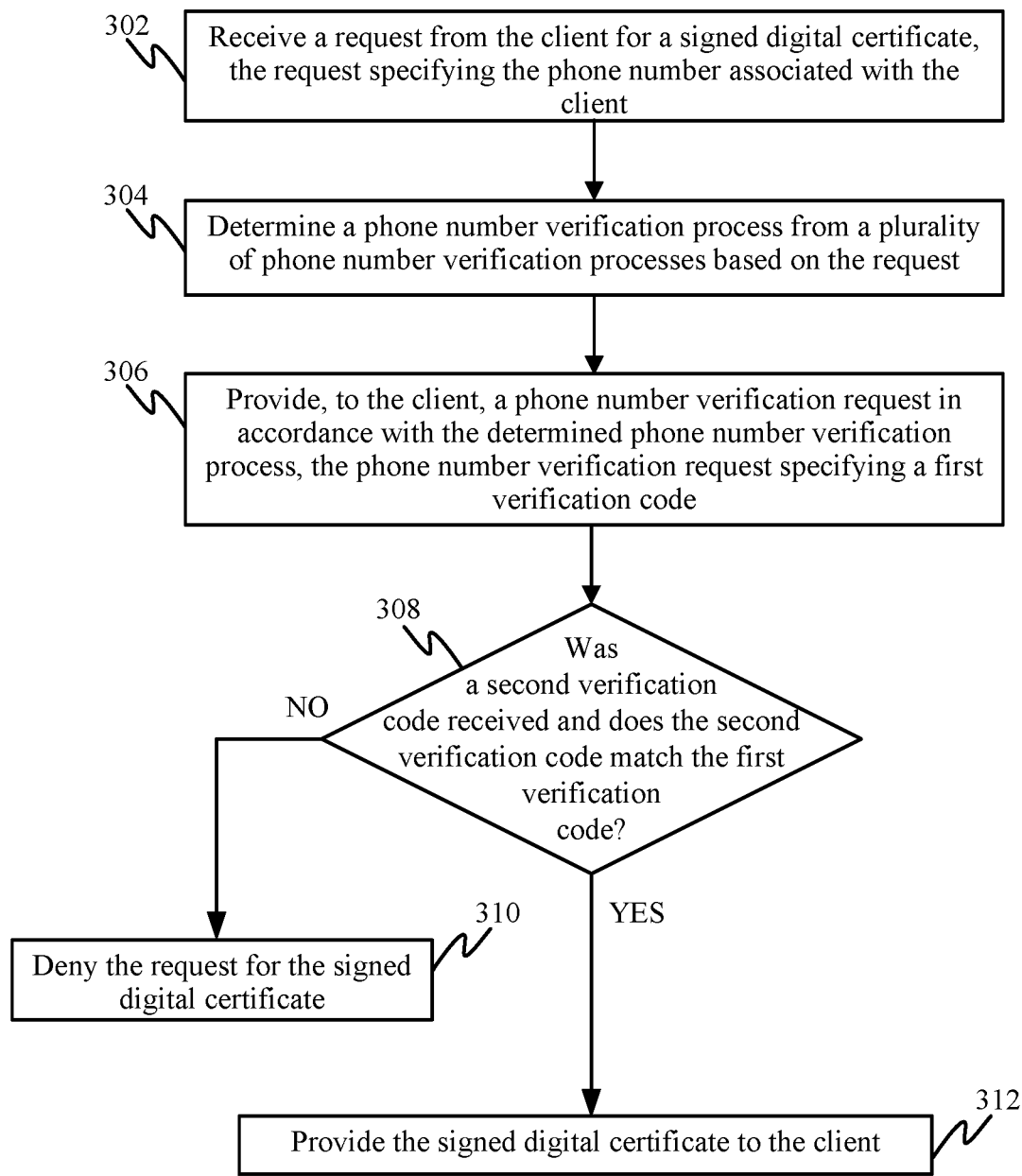
FIG. 3 shows a flowchart of a method for associating a signed digital certificate with a phone number associated with a client in accordance with an example embodiment.

Accordingly, a signed digital certificate may be associated with a phone number in many ways. For example, FIG. 3 shows a flowchart 300 of a method for associating a signed digital certificate with a phone number with a client in accordance with an example embodiment. In an embodiment, flowchart 300 may be implemented by system 200, as described in FIG. 2. Accordingly, flowchart 300 will be described with continued reference FIG. 2. Other structural and operational embodiments will be apparent to persons skilled in the relevant art(s) based on the following discussion regarding flowchart 300 and system 200.

As shown in FIG. 3, the method of flowchart 300 begins at step 302. At step 302, a request is received from a client for a signed digital certificate, the request specifying the phone number associated with the client. For example, with reference to FIG. 2, request receiver 222 of certificate authority 202 receives a request 234 for a signed digital certificate from request sender 226 of PNC application 214. Request 234 specifies the phone number associated with telephonic device 216 of client 206.

At step 304, a phone number verification process from a plurality of phone number verification processes is determined based on the request. For example, with reference to FIG. 2, request receiver 222 of certificate authority 202 determines a phone number verification process from a plurality of phone number verification processes based on request 234.

In accordance with one or more embodiments, the request further specifies the phone number verification process. For example, with reference to FIG. 2, request 234 further specifies a phone number verification process from a plurality of different phone number verification processes, and request receiver 222 analyzes request 234 to determine the phone number verification process. In another example, request receiver 222 infers the phone number verification process based on how request 234 is received. For instance, certificate authority 202 may be configured to receive requests from client 206 via different URIs associated with certificate authority 202, where each URI is mapped to a different phone number verification process. Accordingly, if a request from client 206 is received via a first URI, request receiver 222 determines that the phone number verification process is the process associated with the first URI. Similarly, if a request from client 206 is received via a second URI, request receiver 222 determines that the phone number verification process is the process associated with the second URI.

At step 306, a phone number verification request is provided to the client in accordance with the determined phone number verification process. The phone number verification request specifies a first verification code. For example, with reference to FIG. 2, code issuer 218 of certificate authority 202 provides a verification request 236 to telephonic device of client 206. Verification request 236 specifies a first verification code.

At step 308, a determination is made as to whether the second verification code was received and, if so, whether the second verification code matches the first verification code. If a determination is made that the second verification code was not received or does not match the first verification code, flow continues to step 310. Otherwise, flow continues to step 312.

For example, with reference to FIG. 2, a user, receiving the first verification code, may enter a second verification code (that matches the first verification code) via user interface 230. PNC application 214 provides the second verification code to code issuer 218 via response 240. Responsive to receiving response 240, code issuer 218 determines whether the second verification code included in response 240 matches the first verification code that was provided via request 236. If no second verification code is received, for example, after expiration of a predetermined period of time or if the received second verification does not match the first verification code, flow continues to step 310. Otherwise, flow continues to step 312.

In accordance with one or more embodiments, the plurality of different phone number verification processes comprises an SMS-based verification process. In accordance with such an embodiment, the phone number verification request is provided as an SMS-based text message that comprises the first verification code. The SMS-based text message is provided via a first communication channel. The second verification code is received via a second communication channel that is different than the first communication channel. For example, with reference to FIG. 2, code issuer 218 issues an SMS-based text message (via request 236) comprising the first verification code to telephonic device 216 via communications network 208. PNC application 214 provides the second verification code to code issuer 218 via communications network 210 (via response 240). For instance, a user, after reading the code, may provide the code via user interface 230, and PNC application 214 provides the code to code issuer 218.

In accordance with one or more embodiments, the plurality of different phone number verification processes comprises an audio code-based verification process. In accordance with such an embodiment, a telephonic communication session is initiated with the client via a first communication channel. Responsive to the telephonic communication session being accepted, the first verification code is provided as an auditory code via the telephonic communication session. The second verification code is received via a second communication channel that is different than the first communication channel. For example, with reference to FIG. 2, code issuer 218 initiates a telephonic communication session with telephonic device 216 of client 206 via communications network 208. Responsive to the telephonic communication session being accepted, code issuer 218 provides (e.g., plays back) an auditory code via the telephonic communication session. PNC application 214 provides the second verification code to code issuer 218 via communications network 210. For instance, a user, after hearing the auditory code, may provide the code via user interface 230, and PNC application 214 provides the code to code issuer 218 via verification response 240.

In accordance with one or more embodiments, the auditory code is in accordance with a DTMF form. In accordance with such an embodiment, when a server of an enterprise telephone system (e.g., server 112) accepts the phone call, code issuer 218 provides (e.g., plays back) a machine-comprehensible auditory code during the phone call. PNC application 214 (executing on server 112) determines the machine-comprehensible audio code and provides the code to code issuer 218 via verification response 240.

At step 310, the request for the signed digital certificate is denied. For example, with reference to FIG. 2, certificate signer 220 does not generate and sign the digital certificate, and request 234 is denied.

At step 312, the signed digital certificate is provided to the client. For example, with reference to FIG. 2, code issuer 218 provides an indication to certificate signer 220 indicating that the second verification code matches the first verification code. Responsive to receiving indication, certificate signer 220 generates and signs the digital certificate and provides the signed digital certificate via response 242.

In accordance with one or more embodiments, in response to determining that the second verification code matches the first verification code, the digital certificate is generated, signed and provided to a lookup service that enables the signed digital certificate to be searchable and retrievable by a plurality of requesting entities. For example, with reference to FIG. 2, certificate signer 220 generates and signs the digital certificate and provides the signed digital certificate to lookup service 204 via communications network 210. Lookup service 204 enables the signed digital signed certificate to be searchable and retrievable by a plurality of requesting entities.

In accordance with one or more embodiments, the signed digital certificate comprises at least one of the phone number associated with the client or a uniform resource identifier associated with a relay server. For example, with reference to FIG. 2, the signed digital certificate comprises at least one of the phone number associated with client 206 or a uniform resource identifier associated with relay server 238.

B. CLI Verification

The embodiments described herein may determine whether a phone number provided via calling line identification (CLI) is accurate or inaccurate. Such embodiments determine that the CLI is accurate in a process referred herein as positive CLI verification and determine that the CLI is inaccurate in a process referred herein as negative CLI verification. In positive CLI verification, the caller sends a message signed with its signed digital certificate (as described above with reference to Subsection A) to the call recipient. The message contains information that is utilized to confirm that the incoming call is actually associated with the provided CLI. Negative CLI verification occurs when no such message was received by the call recipient and a signed digital certificate was issued to the phone number provided in the CLI. The call recipient sends a message to the certificate holder to verify that the certificate holder did not just make the telephone call. If the certificate holder confirms that no such call was made, then the call recipient can determine that the incoming CLI is not accurate.

Such embodiments can verify incoming CLI as accurate and determine that illegitimate phone number spoofing is occurring. It is also flexible enough to accommodate legitimate use cases where spoofing may be desired, such as a company which wants to set all outgoing calls to provide the CLI of a central company line.

Subsection B.1 below describes embodiments directed to positive CLI verification. Subsection B.2 below described embodiments directed to negative CLI verification.

1. Positive CLI Verification

Figure 4:
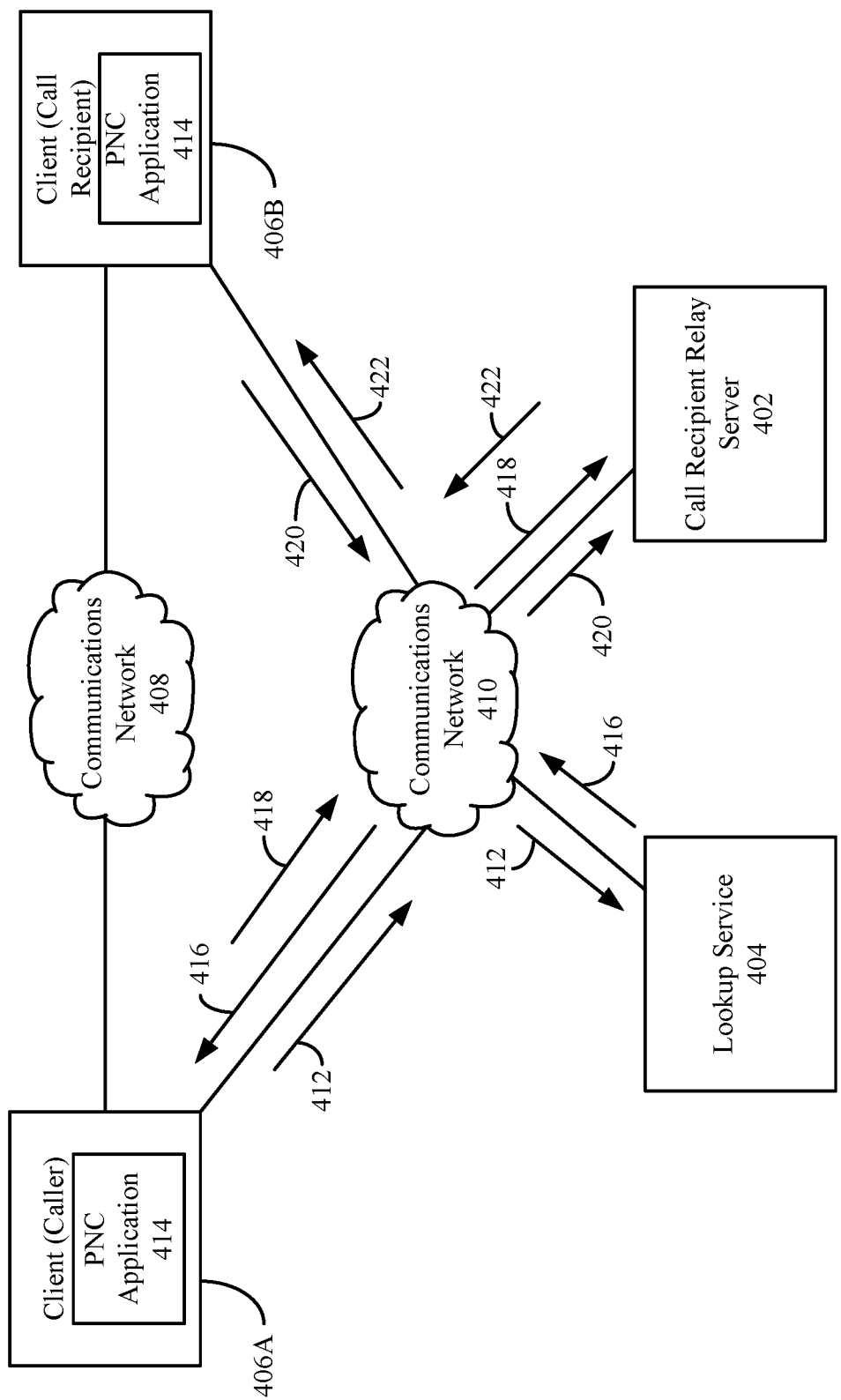
FIG. 4 is a block diagram of a system for performing positive calling line identification verification in accordance with an example embodiment.

FIG. 4 is a block diagram of a system 400 for performing positive CLI verification in accordance with an example embodiment. As shown in FIG. 4, system 400 includes a call recipient relay server 402, a lookup service 404, a client 406A, and a client 406B. Clients 406A and 406B are each an example of clients 106A-106C, as described above with reference to FIG. 1. Each of clients 406A and 406B comprise a PNC application 414, which is an example of PNC application 114 or PNC application 214, as respectively described above with reference to FIGS. 1 and 2. Clients 406A and 406B are communicatively coupled via a communications network 408, which is an example of communications network 108, as described above with reference to FIG. 1. Each of clients 406A and 406 are also communicatively coupled to lookup service 404 and call recipient relay server 402 via a communications network 410, which is an example of communications network 110, as described above with reference to FIG. 1. Lookup service 404 is an example of lookup service 104, as described above with reference to FIG. 1. Call recipient relay server 402 is an example of relay server 138, as described above with reference to FIG. 1. In the example shown in FIG. 4, client 406A represents a caller and client 406B represents a call recipient. Both clients 406A and 406B have been issued signed digital certificates, and client 406B has a statically-addressable URI allocated therefor via call recipient relay server 402.

Positive CLI verification may be initiated when a caller initiates a telephonic communication session via communications network 408 (e.g., by placing an outgoing phone call, for example, by dialing a phone number and/or pressing the 'Call button, etc.). Upon initiating the telephonic communication session, PNC application 414 of client 406A provides a request 412 to lookup service 404 via communications network 410 for the call recipient's (i.e., client 406B) signed digital certificate and statically-addressable URI. Request 412 specifies the phone number of the call recipient. Lookup service 404 determines (i.e., looks up) the signed digital certificate and/or the call recipient's relay server address that is associated with the phone number and provides a response 416 via communications network 410. Response 416 includes the digital signed certificate and statically-addressable URI. In accordance with an embodiment, the statically-addressable URI is included in the signed digital certificate. Client 406A may optionally locally cache the digital signed certificate and the URI, thereby enabling PNC application 414 to locally retrieve the signed digital certificate and the URI without having to query lookup service 404. Client 406A establishes a connection (e.g., an IP-based connection, such as, but not limited to a transmission control protocol (TCP)-based connection, a hypertext transfer protocol (HTTP)-based connection, an open source remote procedure call-based connection (e.g., gRPC), a user datagram protocol (UDP)-based connection) with call recipient relay server 402 using the URI. In accordance with an embodiment, the connection is a persistent connection. The foregoing operations may occur before the phone call is placed to the call recipient Alternatively, the foregoing operations may occur while the phone call is being placed (i.e., while attempting to connect with client 406B).

PNC application 414 of client 406A generates a CLI verification message 418 and sends it to call recipient relay server 402 using the URI associated with client 406B via communications network 410. CLI verification message 418 may be signed using the digital certificate of client 406A to indicate that the message 418 is indeed provided by client 406A. In certain embodiments, such as the embodiment described above with reference to client 106A, CLI verification message 418 may be signed using a plurality of digital certificates associated with client 406A (for example, signed using a first digital certificate associated with an employee's direct line and a second digital certificate associated with a company's main line). CLI verification message 418 may comprise the phone number of the caller (i.e., client 406A), the phone number of the call recipient (client 406B), the time at which the call was initiated, and/or a session identifier for the call. CLI verification message 418 may further comprise an online certificate status protocol (OCSP) stapled response, which verifies the validity status of the signed digital certificate associated with client 406A. PNC application 414 may encrypt CLI verification message 418 (or portions thereof), for example, using the public key of the call recipient (which is included in the call recipient's signed digital certificate retrieved from lookup service 404), before sending CLI verification message 418 to call recipient relay server 402. PNC application 414 may leave portions of CLI verification message 418 (e.g., the phone number of the call recipient). This enables the call recipient to determine which private key to use to decrypt CLI verification message 418. Call recipient relay server 402 associates CLI verification message 418 with the phone number of the call recipient and stores CLI verification message 418.

CLI verification message 418 remains encrypted when stored on call recipient relay server 402, thereby ensuring that only the intended call recipient is able to read the contents thereof. Thus, even if call recipient relay server 402 is compromised, the attacker would not be able to extract any of the caller's and call recipient's private data.

When the communication session (i.e., phone call) is received by client 406B (but before the user has answered the phone call), PNC application 414 of client 406B extracts the phone number from the incoming CLI. If client 406B is already not connected to call recipient relay server 402, PNC application 414 may establish a connection with call recipient relay server 402, for example, using the statically-addressable URI associated with the phone number of client 406B. The connection may be a persistent connection, thereby enabling call recipient relay server 402 to push messages, such as CLI verification messages, to client 406B. In an embodiment in which a persistent connection is not maintained, PNC application 414 may provide a request 420 via communications network 410 for any messages (e.g., CLI verification message 418) that are being held by call recipient relay server 402 and that are directed to client 406B. Request 420 comprises the digital signature of client 406B associated with client 406B.

Call recipient relay server 402 verifies the identity of the call recipient based on the digital signature of request 420. If the identity is verified, call recipient relay server 402 provides a response 422 to PNC application 414 of client 406B via communications network 410. Response 422 comprises the CLI verification message(s) (CLI verification message 418) that were being held for client 406B.

PNC application 414 of client 406B decrypts the received message(s), e.g., using the private key associated with client 406B and analyzes the message(s) to determine the type of message (e.g., whether they are verification messages), whether it is properly signed and to determine the phone number (included in the message(s)) of the client (i.e., client 406A) that issued the CLI verification message(s). If the CLI verification message(s) are properly signed, PNC application 414 compares the determined phone number to the phone number extracted from the incoming CLI. PNC application 414 may also compare the time of the communication sessions including in the CLI verification message(s) to the time at which client 406B receives the incoming phone call. If a determination is made that the phone numbers match and/or that the times are within a predetermined threshold (e.g., within 30 seconds) then PNC application 414 of client 406B determines that the phone number specified by the incoming CLI is accurate (i.e., that the phone number has not been spoofed).

It is noted that if the CLI verification message does not include a stapled OCSP response and the certificate for the phone number associated with the caller, PNC application 414 of client 406B may retrieve the certificate status information from lookup service 404 or via one or more certificate revocation lists (CRLs), e.g., obtained from the certificate authority (e.g., certificate authority 202, as shown in FIG. 2).

Responsive to determining that the incoming CLI is accurate, PNC application 414 of client 406B may cause a notification to be displayed and/or played back indicating the accurate CLI. For instance, PNC application 414 cause an indicator (e.g., a checkmark) to be displayed on a display screen of a telephonic device (or PNC device, e.g., PNC device 116, as shown in FIG. 1) associated with client 406B. In another example, PNC application may cause a light emitting diode (LED) associated with the telephonic device or PNC device to activated (e.g., a green LED) that indicates that the incoming CLI is accurate. In yet another example, PNC application 414 may playback a particular sound or ringtone via a speaker of the telephone device and/or PNC device.

If a determination is made that the phone numbers do not match and/or that the times are not within a predetermined threshold, then PNC application 414 of client 406B determines that the phone number specified by the incoming CLI may be inaccurate (i.e., that the phone number has been spoofed) and performs a negative CLI verification process, which is described below in Subsection B.2. PNC application 414 may also determine that the phone number specified by the incoming CLI may be inaccurate and perform a negative CLI verification process if there are no pending CLI verification message(s) held for client 406B by call recipient relay server 402.

Figure 5:
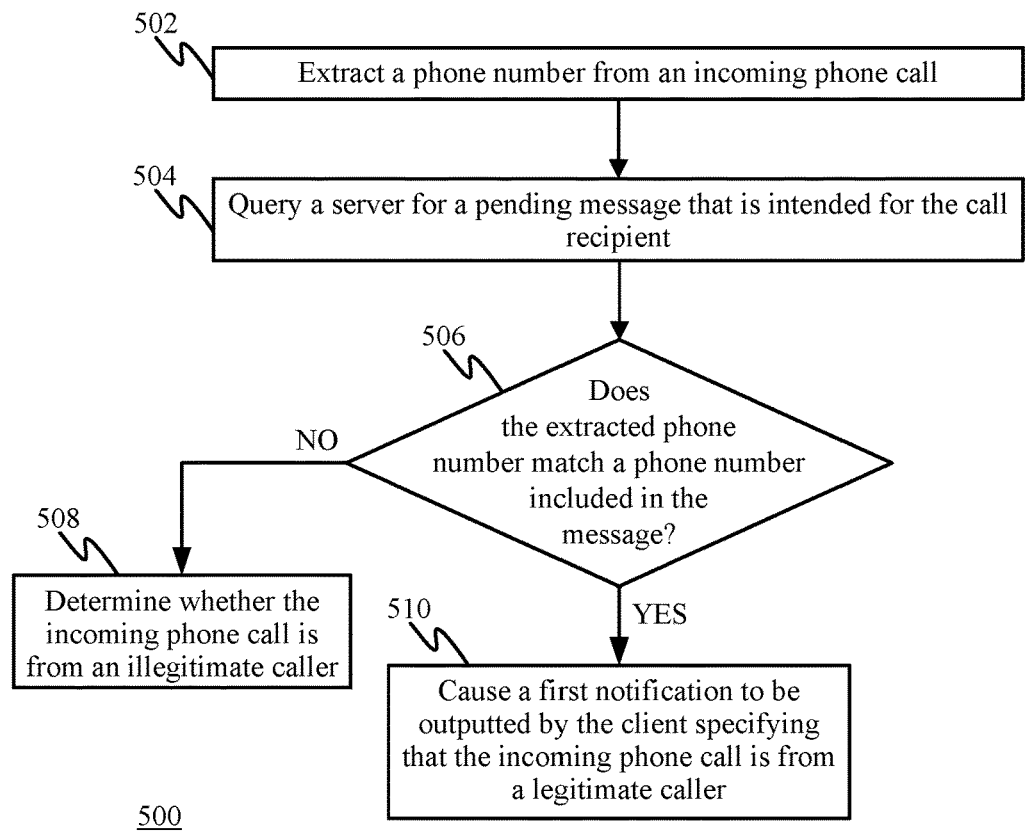
FIG. 5 shows a flowchart of a method implemented by a client associated with a call recipient for verifying a phone number included in incoming calling line identification in accordance with an example embodiment.
Figure 6:
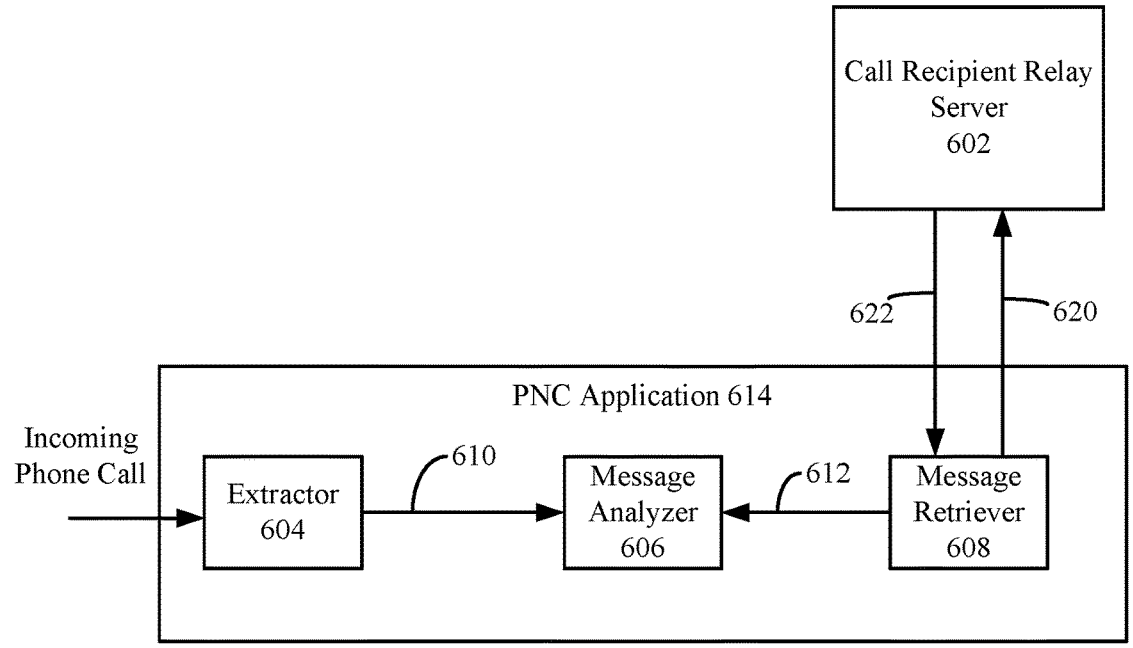
FIG. 6 is a block diagram of a system for verifying a phone number included in incoming calling line identification in accordance with an example embodiment.

Accordingly, a phone number included in incoming CLI may be verified by a client associated with a call recipient in many ways. For example, FIG. 5 shows a flowchart 500 of a method implemented by a client associated with a call recipient for verifying a phone number included in incoming CLI in accordance with an example embodiment. In an embodiment, flowchart 500 may be implemented by system 600, as shown in FIG. 6. Accordingly, flowchart 500 will be described with reference FIG. 6. FIG. 6 is a block diagram of a system 600 for verifying a phone number included in incoming CLI in accordance with an example embodiment. As shown in FIG. 6, system 600 comprises a call recipient relay server 602 and a PNC application 614. Call recipient relay server 602 and PNC application 614 are examples of call recipient relay server 402 and PNC application 414, as described above with reference to FIG. 4. Call recipient relay server 602 and PNC application 614 are communicatively coupled via a network, e.g., communications network 410, as described above with reference to FIG. 4. As also shown in FIG. 6, PNC application 614 comprises an extractor 604, a message analyzer 606, and a message retriever 608. Other structural and operational embodiments will be apparent to persons skilled in the relevant art(s) based on the following discussion regarding flowchart 500 and system 600.

As shown in FIG. 5, the method of flowchart 500 begins at step 502, in which a phone number is extracted from an incoming phone call. For example, with reference to FIG. 6, extractor 604 extracts a phone number from CLI of an incoming phone call. Extractor 604 provides the phone number (shown as phone number 610) to message analyzer 606.

At step 504, a server is queried for a pending message that is intended for the call recipient. For example, with reference to FIG. 6, message retriever 608 provides a request 620 to call recipient relay server 602 for any pending message(s)

intended for the call recipient. Request 620 is an example of request 420, as described above with reference to FIG. 4.

At step 506, a determination is made as to whether the extracted phone number matches a phone number included in the message. If a determination is made that the extracted phone number does not match the phone number in the message (or if no message is pending or received), flow continues to step 508. Otherwise, flow continues to step 510. For example, with reference to FIG. 6, if a pending message for the call recipient is available, call recipient relay server 602 may provide a response 622 comprising the message to message retriever 608. Message retriever 608 provides the message (shown as message 612) to message analyzer 606. Response 622 is an example of response 422, as described above with reference to FIG. 4. Message analyzer 606 may analyze message 612 to determine whether it is a verification message. If so, message analyzer 606 determines whether the verification message comprises the phone number of the caller from which it originates. For instance, the phone number may be included as part of message 612 itself or may be obtained via the signature of verification message 612. Message analyzer 606 compares phone number 610 with the phone number included in verification message 612.

In the event that call recipient relay server 602 does not have any pending messages, call recipient relay server 602 may provide a response indicating as such to message retriever 608. Alternatively, message retriever 608 may determine that no such messages are available after a predetermined period of time expires since providing request 620 (i.e., response 620 times out).

At step 508, a determination is made as to whether the incoming phone call is from an illegitimate caller. Additional details regarding step 508 are described below with respect to Subsection B.2.

At step 510, a first notification is caused to be outputted by the client specifying that the incoming phone call is from a legitimate caller. For example, with reference to FIG. 6, in response to determining that phone number 610 matches the phone number included in verification message 612, message analyzer 606 causes PNC application 614 to output a first notification. For instance, PNC application 614 may cause a visual indicator (e.g., a checkmark) to be outputted on a display screen of a telephonic device (or PNC device, e.g., PNC device 116, as shown in FIG. 1) associated with the call recipient's client. In another example, PNC application may cause a light emitting diode (LED) associated with the telephonic device or PNC device to activated (e.g., a green LED) that indicates that the incoming CLI is accurate. In yet another example, PNC application 614 may playback a particular sound or ringtone via a speaker of the telephone device and/or PNC device.

2. Negative CLI Verification

Figure 7:
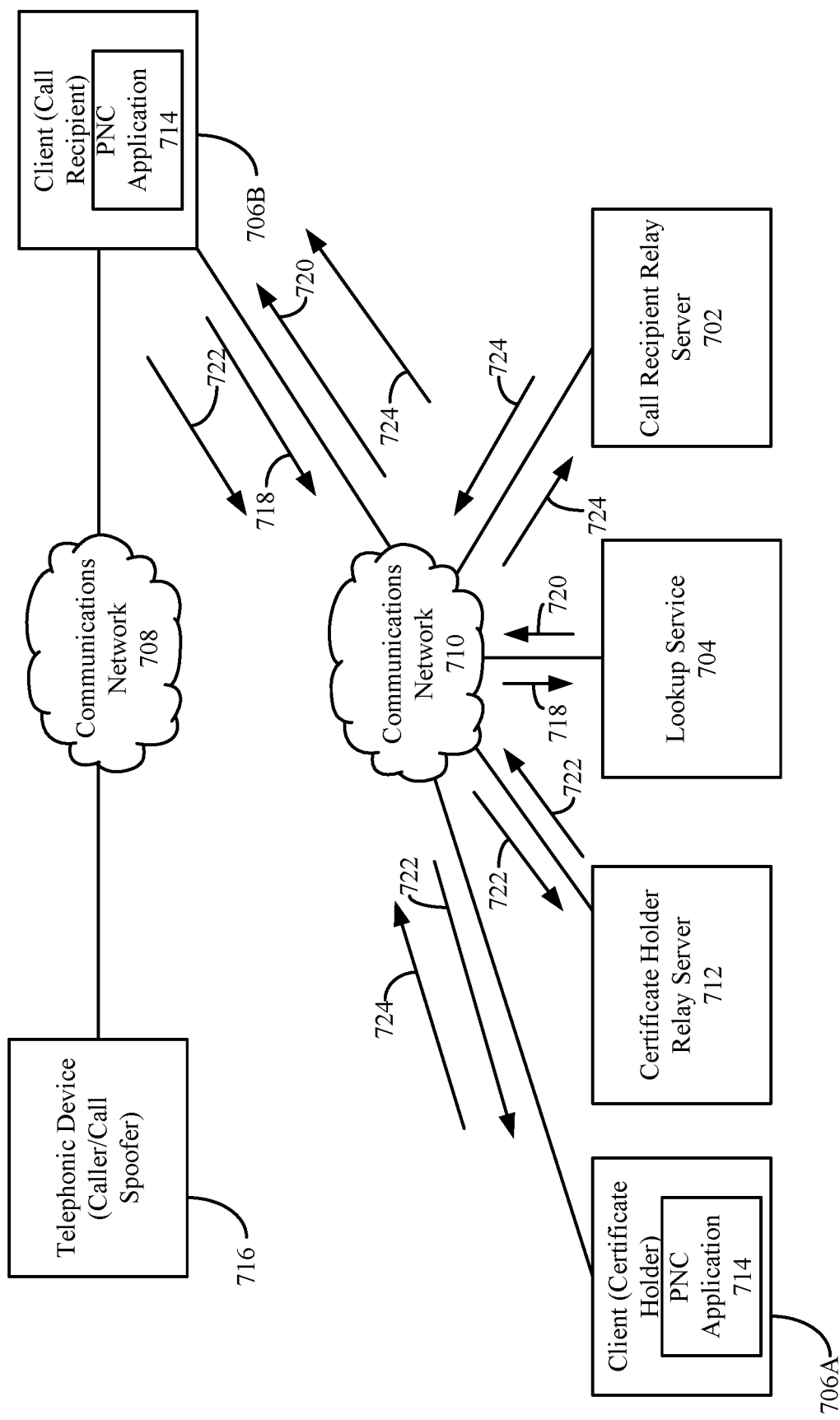
FIG. 7 is a block diagram of a system for performing negative calling line identification verification in accordance with an example embodiment.

FIG. 7 is a block diagram of a system 700 for performing negative CLI verification in accordance with an example embodiment. As shown in FIG. 7, system 700 includes a call recipient relay server 702, a lookup service 704, a client 706A, a client 706B, a telephonic device 716, and a certificate holder relay server 712. Clients 706A and 706B are each an example of clients 106A-106C, as described above with reference to FIG. 1. Each of clients 706A and 706B comprise a PNC application 714, which is an example of PNC application 114, PNC application 214, PNC application 414, or PNC application 614 as respectively described above with reference to FIGS. 1, 2, 4, and 6. Lookup service 704 is an example of lookup service 104, lookup service 204, and lookup service 404, as respectively described above with reference to FIGS. 1, 2, and 4. Call recipient relay server 702 is an example of relay server 138, relay server 238, call recipient relay server 402, and call recipient relay server 602, as respectively described above with reference to FIGS. 1, 2, 4, and 6. Certificate holder relay server 712 is an example of relay server 138 and relay server 238, as respectively described above with reference to FIGS. 1 and 2. Client 706B, lookup service 704, call recipient relay server 702, and certificate holder relay server 712 are communicatively coupled via communications network 710, which is an example of communications network 110, as described above with reference to FIG. 1. Client 706B is communicatively coupled to call recipient relay server 702 via a persistent connection thereto.

In the example shown in FIG. 7, telephonic device 716 is associated with a caller that initiates a communication session (e.g., a phone call) via communications network 708 using a spoofed phone number (i.e., using another entity's phone number that is not owned by the caller). Communications network 708 is an example of communications network 108, as described above with reference to FIG. 1. Client 706B represents the call recipient of the communication session. Client 706A represents the entity that had his number spoofed and that owns a digital certificate for his phone number. Both clients 706A and 706B have been issued signed digital certificates, client 406B has a statically-addressable URI allocated therefor via call recipient relay server 702, and client 606A has a statically-addressable URI allocated therefor via certificate holder relay server 712. Caller 716 has not obtained a signed digital certificate for the number he is spoofing. Instead, as described above, client 706A has obtained the digital certificate for the number being spoofed by caller 716.

Negative CLI verification is used by a call recipient (i.e., client 706B) to verify that incoming CLI is not correct (or inaccurate). Negative CLI verification may be initiated when PNC application 714 of client 706B determines that no verification message(s) are pending in call recipient relay server 702 or, if verification message(s) are pending, the phone number specified by such message(s) does not match the phone number extracted from the CLI of the telephonic communication session initiated by caller 716 (as described above with reference to steps 506 and 508 of flowchart 500 of FIG. 5.

After determining that no verification message(s) are pending or if a phone number specified by verification message(s) do not match the extracted phone number, PNC application 714 of client 706B provides a request 718 to lookup service 704 via communications network 710 to determine whether the extracted phone number is associated with a signed digital certificate. Request 718 specifies the extracted phone number. Lookup service 704 determines whether a signed digital certificate is associated with such a number. If no digital certificate is associated, lookup service 704 may provide a response indicating as such and negative CLI verification is not performed. In the event that a digital certificate is associated with such a number, lookup service 704 provides a response 720 comprising the signed digital certificate to PNC application 714 of client 706B via communications network 710. Response 720 may further include a statically-addressable URI of relay server that has been allocated for the certificate holder. In the example shown in FIG. 7, the extracted phone number is associated with client 706A, and the statically-addressable URI corresponds to certificate holder relay server 712. In accordance with an embodiment, the statically-addressable URI is included in the signed digital certificate provided via response 720. Client 706B may optionally locally cache the digital signed certificate and the URI, thereby enabling PNC application 714 to retrieve the signed digital certificate and the URI without having to query lookup service 704.

In accordance with an embodiment, PNC application 714 of client 706B determines the URI of certificate holder relay server 712 provided thereto and provides a verification message 722 to certificate holder relay server 712 based on the URI. Verification message 722 may be signed using the digital certificate of client 706B and may be entirely or partially encrypted using the public key of client 706A (as obtained via the digital certificate retrieved from lookup service 704). Verification message 722 may include the signed digital certificate of client 706B and the statically-addressable URI corresponding to call recipient relay server 702 and inquires whether certificate holder 706A initiated the telephonic communication session. Certificate holder relay server 712 provides (or relays) verification message 722 to PNC application 714 of certificate holder 706A via communications network 710. PNC application 714 of certificate holder 706A may decrypt verification message 722 using the private key associated with certificate holder 706A and determine the statically-addressable URI corresponding to call recipient relay server 702 form verification message 722. Alternatively, PNC application 714 may use the phone number of call recipient 706B specified in the signed digital certificate included in verification message 722 and lookup the URI via lookup service 704.

PNC application 714 provides a response 724 indicating whether or not the telephonic communication session was initiated thereby. Response 724 may be signed using the digital certificate of certificate holder 706A and may be entirely or partially encrypted using the public key of client 706B (as determined from the received digital certificate of client 706B). Response 724 is provided to call recipient relay server 702 via communications network 710 using the determined URI, and call recipient relay server 702 provides (or relays) response 724 to PNC application 714 of call recipient 706B via communications network 710. PNC application 714 of client 706B decrypts the response using the private key associated with client 706B. If response 724 indicates that certificate holder 706A initiated the telephonic communication session, then PNC application 714 of client 706B determines that the phone number extracted from the CLI is accurate. If response 724 indicates that the certificate holder did not initiate the telephonic communication session, then PNC application of client 706B determines that the extracted phone number is inaccurate (i.e., the phone number was spoofed).

In accordance with another embodiment, instead of certificate holder relay server 712 relaying verification message 722 to PNC application 714 of certificate holder 706A, certificate holder relay server 712 determines whether client 706A is online and available. For instance, if client 706A has a persistent connection with certificate holder relay server 712, certificate holder relay server 712 may determine that client 706 is online and available, and therefore, capable of providing positive CLI-related verification messages (as described with reference to Subsection B.1). Certificate holder relay server 712 provides a response to PNC application 714 of client 706B indicating whether or not certificate holder 706A is online and available. If the response indicates that certificate holder 706A is online and available, then PNC application 714 of client 706B infers that the extracted phone number is inaccurate, as no positive CLI-related verification messages were provided by certificate holder 706A. If the response indicates that certificate holder 706A is not online, PNC application 714 cannot make a determination on the accuracy of the extracted phone number. That is, the telephonic communication session may have been initiated by certificate holder 706A, however PNC application 714 cannot definitively ascertain whether or not certificate holder 706A did so.

Responsive to determining that the incoming CLI is inaccurate, PNC application 704 of client 706B may cause a notification to be displayed and/or played back indicating the inaccurate CLI. For instance, PNC application 714 may cause an indicator (e.g., an "X") to be displayed on a display screen of a telephonic device (or PNC device, e.g., PNC device 116, as shown in FIG. 1) associated with client 706B. In another example, PNC application 714 may cause a light emitting diode (LED) associated with the telephonic device or PNC device to activated (e.g., a red LED) that indicates that the incoming CLI is inaccurate. In yet another example, PNC application 714 may playback a particular sound or ringtone via a speaker of the telephone device and/or PNC device that indicates that the incoming CLI is inaccurate.

Figure 8:
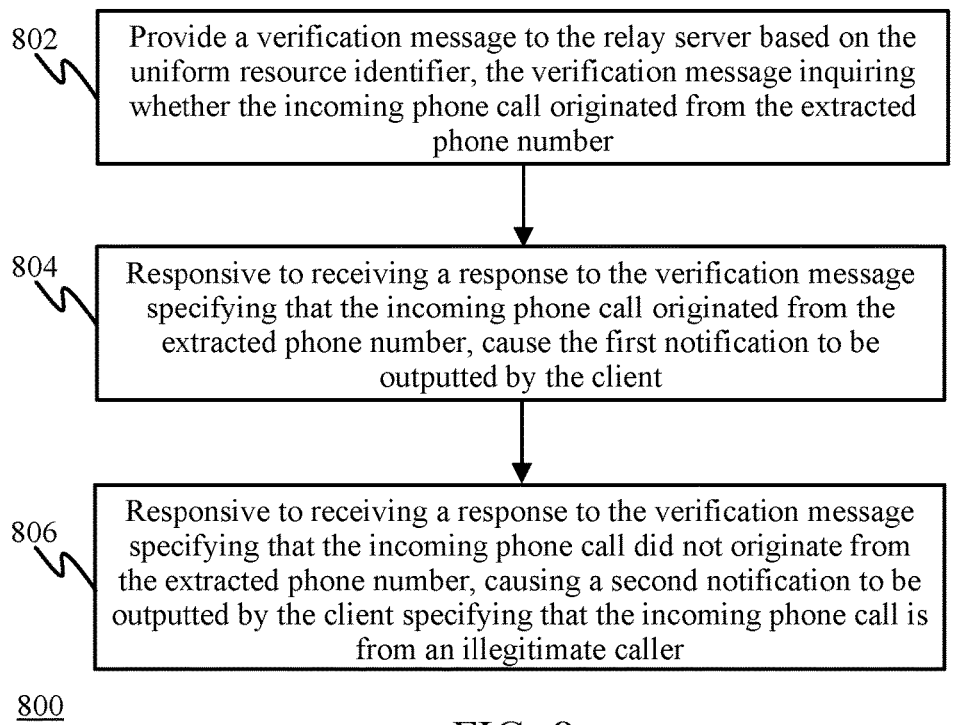
FIG. 8 shows a flowchart of a method implemented by a client associated with a call recipient for determining whether a phone number included in an incoming calling line identification is inaccurate in accordance with an example embodiment.
Figure 9:
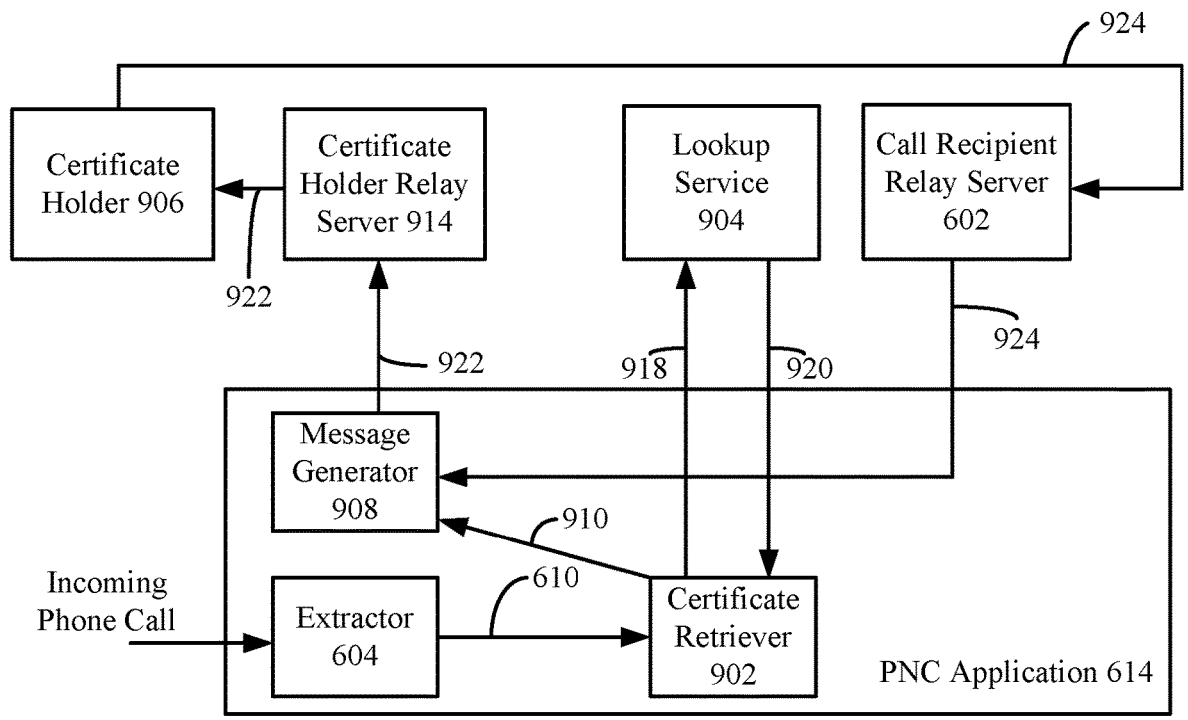
FIG. 9 is a block diagram of a system for determining whether a phone number included in an incoming calling line identification is inaccurate in accordance with an example embodiment.

Accordingly, a phone number included in incoming CLI may be determined to be inaccurate by a client associated with a call recipient in many ways. For example, FIG. 8 shows a flowchart 800 of a method implemented by a client associated with a call recipient for determining whether a phone number included in incoming CLI is inaccurate in accordance with an example embodiment. In an embodiment, flowchart 800 may be implemented by system 900, as shown in FIG. 9. Accordingly, flowchart 800 will be described with reference FIG. 9. FIG. 9 is a block diagram of a system 900 for determining whether a phone number included in incoming CLI is in inaccurate in accordance with an example embodiment. As shown in FIG. 9, system 900 comprises call recipient relay server 602 and PNC application 614, as described above with reference to FIG. 6. System 900 further includes a lookup service 904, a certificate holder relay server 914, and a certificate holder 906. Lookup service 904, certificate holder relay server 914, and certificate holder 906 are examples of lookup service 704, certificate holder relay server 712, and certificate holder 706A, as respectively described above with reference to FIG. 7. Call recipient relay server 602, lookup service 904, certificate holder relay server 914, certificate holder 906, and PNC application 614 are communicatively coupled via a network, e.g., communications network 710, as described above with reference to FIG. 7. As also shown in FIG. 6, PNC application 614 comprises extractor 604, as described above with reference to FIG. 6. PNC application 614 further comprises a certificate retriever 902 and a message generator 908. Other structural and operational embodiments will be apparent to persons skilled in the relevant art(s) based on the following discussion regarding flowchart 800 and system 900.

As shown in FIG. 8, the method of flowchart 800 begins at step 802, in which a verification message is provided to a relay server based on a uniform resource identifier, the verification message inquiring whether the incoming phone call originated from the extracted phone. For example, with reference to FIG. 9, message generator 908 generates and provides a message 922 to certificate holder relay server 914 based on a uniform resource identifier. Message 922 inquires whether certificate holder 906 initiated the incoming phone call. Message 922 is an example of message 722, as described above with reference to FIG. 7.

In accordance with one or more embodiments, the uniform resource identifier is included in a digital certificate associated with the extracted phone number. For example, with reference to FIG. 9, responsive to receiving an incoming phone call, extractor 604 extracts phone number 610 from the CLI and provides phone number 610 to certificate retriever 602. Certificate retriever 902 provides a request 918 comprising phone number 610 to lookup service 904. Request 918 is an example of request 718, as described above with reference to FIG. 7. Lookup service 904 determines whether a digital certificate is associated with the phone number. Responsive to determining that a digital certificate is associated with the phone number, lookup service 904 provides a response 920 comprising the digital certificate to certificate retriever 902. The digital certificate may include the uniform resource identifier. Alternatively, lookup service 904 maintains the uniform resource identifier separately from the digital certificate. Certificate retriever 902 provides the uniform resource identifier to message generator 908.

In accordance with one or more embodiments, the lookup service maintains a plurality of digital certificates and a plurality of uniform resource identifiers that are associated with a plurality of different phone numbers. For example, with reference to FIG. 9, lookup service 904 maintains a plurality of digital certificates and a plurality of uniform resource identifiers that are associated with a plurality of different phone numbers.

In accordance with one or more embodiments, the verification message comprises a digital signature from a signed digital certificate that authenticates the identity of the call recipient, and wherein the digital certificate comprises a phone number of the call recipient. For example, with reference to FIG. 9, message 922 may comprise the digital signature from the signed digital certificate of the client associated with PNC application 614, along with the statically-addressable uniform resource identifier of call recipient relay server 602.

In accordance with one or more embodiments, the signed digital certificate further comprises a uniform resource identifier specifying a relay server that is associated with the call recipient. For example, with reference to FIG. 9, the signed digital certificate included in message 922 may include statically-addressable uniform resource identifier of call recipient relay server 602.

At step 804, responsive to receiving a response to the verification message specifying that the incoming phone call originated from the extracted phone number, a first notification is caused to be outputted by the client. For example, with reference to FIG. 9, certificate holder relay server 914 may provide message 922 to PNC application (not shown) executing on the client of certificate holder 906. The PNC application may respond to the message indicating that certificate holder 906 made the incoming phone call. For example, the PNC application of certificate holder 906 may determine the statically-addressable URI included in message 922 and provide a response 924 to call recipient relay server 602 specifying that certificate holder 906 initiated the incoming phone call. Response 924 is an example of response 724, as described above with reference to FIG. 7. Call recipient relay server 602 provides message 924 to message generator 908. Message 924 may be encrypted using the public key of the call recipient (e.g, as generated by PNC application 614, as described above with reference to FIG. 2). Message generator 908 may decrypt message 924 using the private key of the call recipient (e.g., as generated by PNC application 614, as described above with reference to FIG. 2). PNC application 614 may cause the first notification to be outputted by the client associated therewith.

In accordance with one or more embodiment, the first notification comprises at least one of a visual indicator outputted via a display screen or an audio indicator outputted via a speaker associated with the client associated with the client. For example, with reference to FIG. 9, PNC application 614 may cause a visual indicator (e.g., a checkmark) to be outputted on a display screen of a telephonic device (or PNC device, e.g., PNC device 116, as shown in FIG. 1) associated with the call recipient's client. In another example, PNC application 614 may cause a light emitting diode (LED) associated with the telephonic device or PNC device to activated (e.g., a green LED) that indicates that the incoming CLI is accurate. In yet another example, PNC application 614 may playback a particular sound or ringtone via a speaker of the telephone device and/or PNC device.

At step 806, responsive to receiving a response to the verification message specifying that the incoming phone call did not originate from the extracted phone number, a second notification is caused to be outputted by the client specifying that the incoming phone call is from an illegitimate caller. For example, the PNC application of certificate holder 906 may determine the statically-addressable URI included in message 922 and provide response 924 to call recipient relay server 602 specifying that certificate holder 906 did not initiate the incoming phone call. Call recipient relay server 602 provides message 924 to message generator 908. PNC application 614 may cause the second notification to be displayed and/or played back indicating the inaccurate CLI. For instance, PNC application 614 may cause an indicator (e.g., an "X") to be displayed on a display screen of a telephonic device (or PNC device, e.g., PNC device 116, as shown in FIG. 1) associated with PNC application 614. In another example, PNC application 614 may cause a light emitting diode (LED) associated with the telephonic device or PNC device to activated (e.g., a red LED) that indicates that the incoming CLI is inaccurate. In yet another example, PNC application 614 may playback a particular sound or ringtone via a speaker of the telephone device and/or PNC device that indicates that the incoming CLI is inaccurate.

III. Example Mobile and Stationary Device Embodiments

The systems and methods described above, including the phone number certification and verification techniques described in reference to FIGS. 1-9, may be implemented in hardware, or hardware combined with one or both of software and/or firmware. For example, certificate authority 102, lookup service 104, relay server 138, clients 106A-106C, telephones 120A-120C, server 112, telephone 118, PNC device 116, PNC application 114, certificate authority 202, lookup service 204, relay server 238, client 206, telephonic device 216, PNC application 214, key generator 224, request sender 226, user interface 230, capabilities 228, clients 406A and 406B, lookup service 404, call recipient relay server 402, PNC application 414, call recipient relay server 602, PNC application 614, extractor 604, message analyzer 606, message retriever 608, clients 706A and 706B, telephonic device 716, call recipient relay server 702, certificate holder relay server 712, lookup service 704, PNC application 714, certificate holder 906, certificate holder relay server 914, lookup service 904, message generator 908, and/or certificate retriever 902, and/or each of the components described therein, and flowcharts 300, 500, and/or 800 may be each implemented as computer program code/instructions configured to be executed in one or more processors and stored in a computer readable storage medium. Alternatively, certificate authority 102, lookup service 104, relay server 138, clients 106A-106C, telephones 120A-120C, server 112, telephone 118, PNC device 116, PNC application 114, certificate authority 202, lookup service 204, relay server 238, client 206, telephonic device 216, PNC application 214, key generator 224, request sender 226, user interface 230, capabilities 228, clients 406A and 406B, lookup service 404, call recipient relay server 402, PNC application 414, call recipient relay server 602, PNC application 614, extractor 604, message analyzer 606, message retriever 608, clients 706A and 706B, telephonic device 716, call recipient relay server 702, certificate holder relay server 712, lookup service 704, PNC application 714, certificate holder 906, certificate holder relay server 914, lookup service 904, message generator 908, and/or certificate retriever 902, and/or each of the components described therein, and flowcharts 300, 500, and/or 800 may be implemented as hardware logic/electrical circuitry. In an embodiment, certificate authority 102, lookup service 104, relay server 138, clients 106A-106C, telephones 120A-120C, server 112, telephone 118, PNC device 116, PNC application 114, certificate authority 202, lookup service 204, relay server 238, client 206, telephonic device 216, PNC application 214, key generator 224, request sender 226, user interface 230, capabilities 228, clients 406A and 406B, lookup service 404, call recipient relay server 402, PNC application 414, call recipient relay server 602, PNC application 614, extractor 604, message analyzer 606, message retriever 608, clients 706A and 706B, telephonic device 716, call recipient relay server 702, certificate holder relay server 712, lookup service 704, PNC application 714, certificate holder 906, certificate holder relay server 914, lookup service 904, message generator 908, and/or certificate retriever 902, and/or each of the components described therein, and flowcharts 300, 500, and/or 800 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 10:
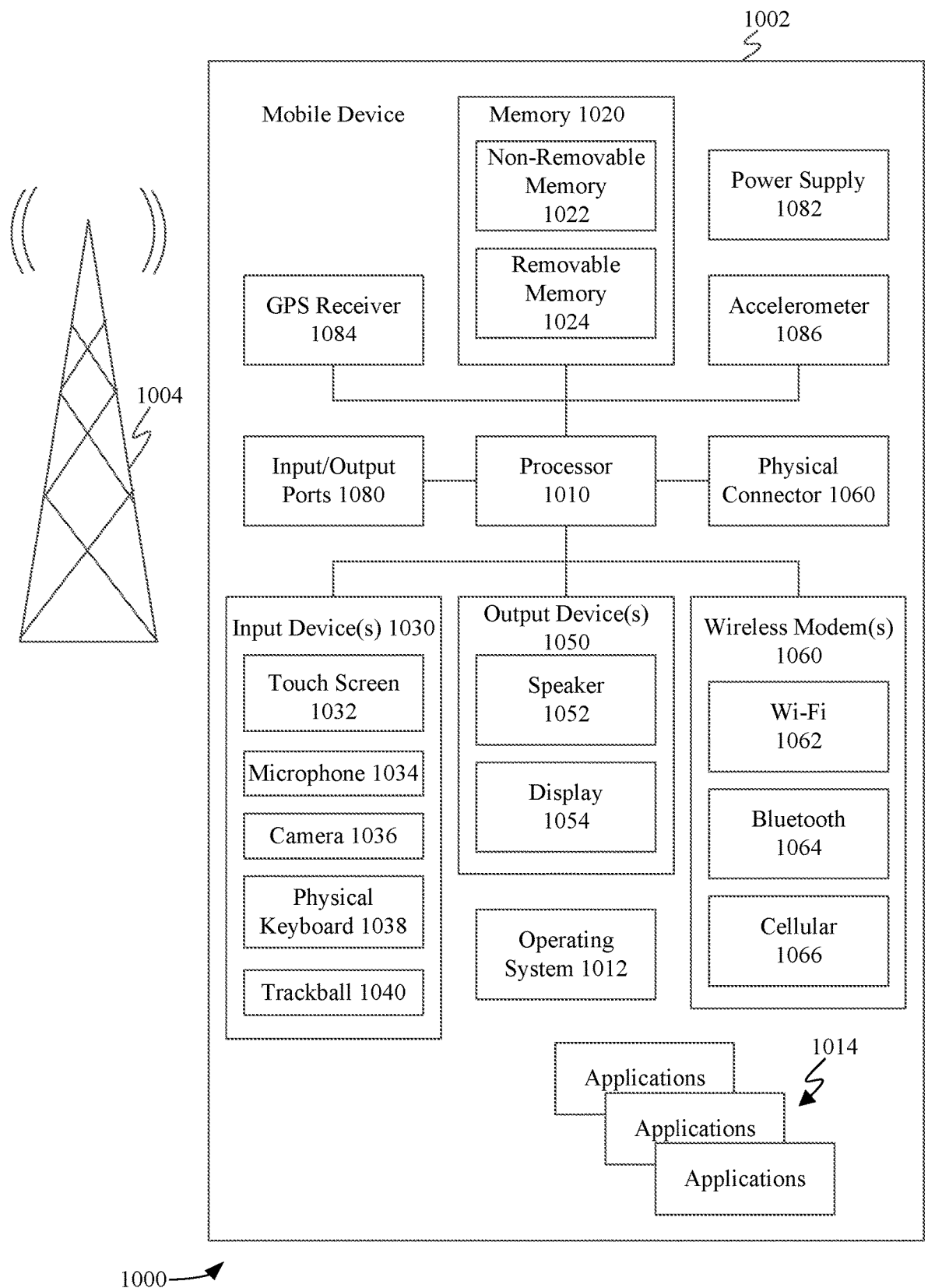
FIG. 10 is a block diagram of an exemplary mobile device in which embodiments may be implemented.

FIG. 10 shows a block diagram of an exemplary mobile device 1000 including a variety of optional hardware and software components, shown generally as components 1002. Any number and combination of the features/elements of the systems and methods described above (e.g., client 106C, PNC application 114, client 206, telephonic device 216, PNC application 214, key generator 224, request sender 226, user interface 230, capabilities 228, clients 406A and 406B, PNC application 414, PNC application 614, extractor 604, message analyzer 606, message retriever 608, clients 706A and 706B, telephonic device 716, PNC application 714, message generator 908, and/or certificate retriever 902, and/or each of the components described therein, and flowcharts 500 and/or 800) may be implemented as components 1002 included in a mobile device embodiment, as well as additional and/or alternative features/elements, as would be known to persons skilled in the relevant art(s). It is noted that any of components 1002 can communicate with any other of components 1002, although not all connections are shown, for ease of illustration. Mobile device 1000 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 1004, such as a cellular or satellite network, or with a local area or wide area network.

The illustrated mobile device 1000 can include a controller or processor referred to as processor circuit 1010 for performing such tasks as signal coding, image processing, data processing, input/output processing, power control, and/or other functions. Processor circuit 1010 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1010 may execute program code stored in a computer readable medium, such as program code of one or more applications 1014, operating system 1012, any program code stored in memory 1020, etc. Operating system 1012 can control the allocation and usage of the components 1002 and support for one or more application programs 1014 (a.k.a. applications, "apps", etc.). Application programs 1014 can include common mobile computing applications (e.g., email applications, calendars, contact managers, web browsers, messaging applications) and any other computing applications (e.g., word processing applications, mapping applications, media player applications).

As illustrated, mobile device 1000 can include memory 1020. Memory 1020 can include non-removable memory 1022 and/or removable memory 1024. The non-removable memory 1022 can include RAM, ROM, flash memory, a hard disk, or other well-known memory storage technologies. The removable memory 1024 can include flash memory or a Subscriber Identity Module (SIM) card, which is well known in GSM communication systems, or other well-known memory storage technologies, such as "smart cards." The memory 1020 can be used for storing data and/or code for running operating system 1012 and applications 1014. Example data can include web pages, text, images, sound files, video data, or other data sets to be sent to and/or received from one or more network servers or other devices via one or more wired or wireless networks. Memory 1020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1020. These programs include operating system 1012, one or more application programs 1014, and other program modules and program data. Examples of such application programs or program modules may include, for example, computer program logic (e.g., computer program code or instructions) for implementing the systems and methods described above, including the embodiments described in reference to FIGS. 1-9.

Mobile device 1000 can support one or more input devices 1030, such as a touch screen 1032, microphone 1034, camera 1036, physical keyboard 1038 and/or trackball 1040 and one or more output devices 1050, such as a speaker 1052 and a display 1054.

Other possible output devices (not shown) can include piezoelectric or other haptic output devices. Some devices can serve more than one input/output function. For example, touch screen 1032 and display 1054 can be combined in a single input/output device. The input devices 1030 can include a Natural User Interface (NUI).

Wireless modem(s) 1060 can be coupled to antenna(s) (not shown) and can support two-way communications between processor circuit 1010 and external devices, as is well understood in the art. The modem(s) 1060 are shown generically and can include a cellular modem 1066 for communicating with the mobile communication network 1004 and/or other radio-based modems (e.g., Bluetooth 1064 and/or Wi-Fi 1062). Cellular modem 1066 may be configured to enable phone calls (and optionally transmit data) according to any suitable communication standard or technology, such as GSM, 3G, 4G, 5G, etc. At least one of the wireless modem(s) 1060 is typically configured for communication with one or more cellular networks, such as a GSM network for data and voice communications within a single cellular network, between cellular networks, or between the mobile device and a public switched telephone network (PSTN).

Mobile device 1000 can further include at least one input/output port 1080, a power supply 1082, a satellite navigation system receiver 1084, such as a Global Positioning System (GPS) receiver, an accelerometer 1086, and/or a physical connector 1090, which can be a USB port, IEEE 1394 (FireWire) port, and/or RS-232 port. The illustrated components 1002 are not required or all-inclusive, as any components can be not present and other components can be additionally present as would be recognized by one skilled in the art.

Figure 11:
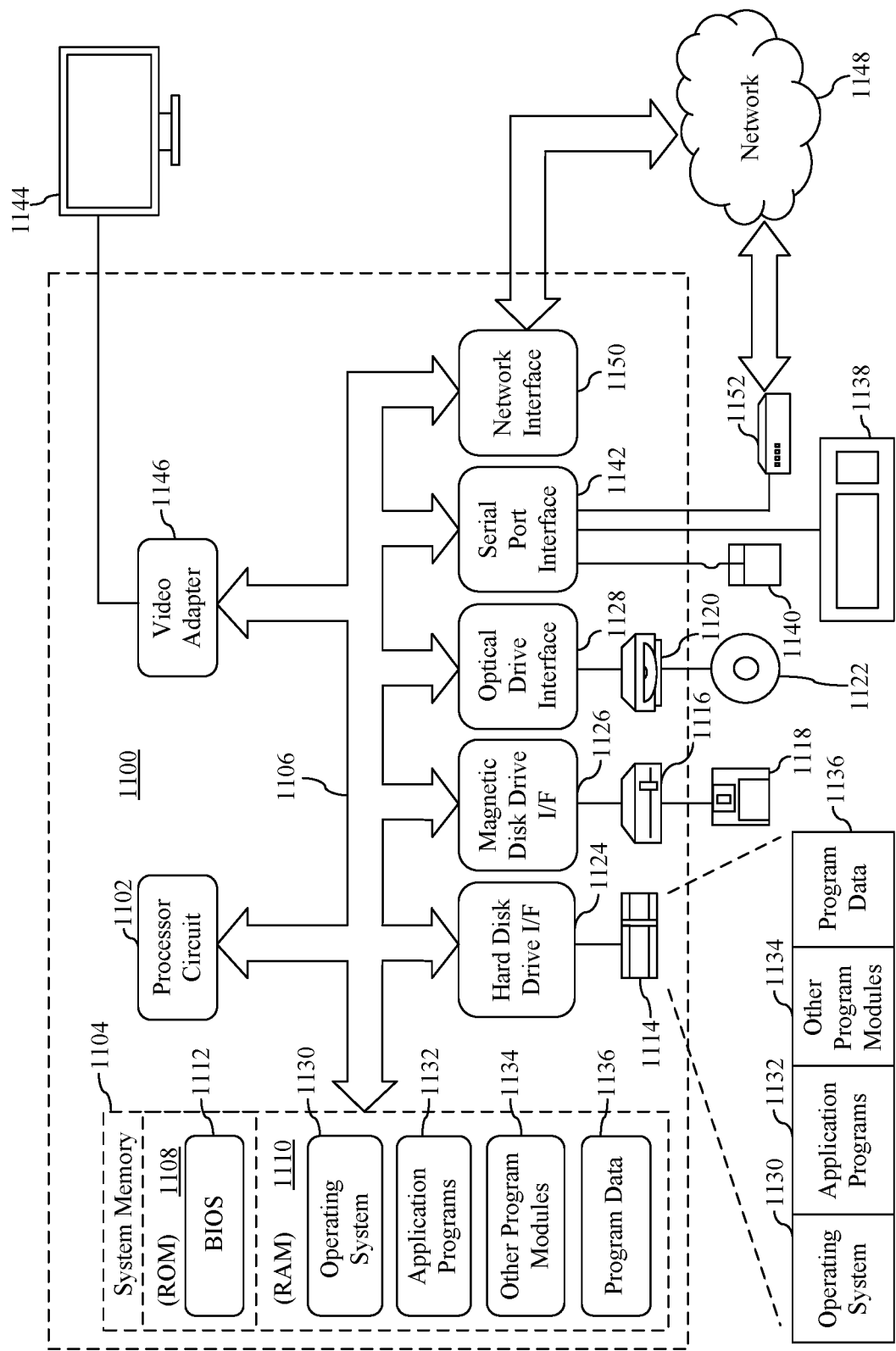
FIG. 11 is a block diagram of an example processor-based computer system that may be used to implement various embodiments.

Furthermore, FIG. 11 depicts an exemplary implementation of a computing device 1100 in which embodiments may be implemented, including certificate authority 102, lookup service 104, relay server 138, clients 106A-106C, telephones 120A-120C, server 112, telephone 118, PNC device 116, PNC application 114, certificate authority 202, lookup service 204, relay server 238, client 206, telephonic device 216, PNC application 214, key generator 224, request sender 226, user interface 230, capabilities 228, clients 406A and 406B, lookup service 404, call recipient relay server 402, PNC application 414, call recipient relay server 602, PNC application 614, extractor 604, message analyzer 606, message retriever 608, clients 706A and 706B, telephonic device 716, call recipient relay server 702, certificate holder relay server 712, lookup service 704, PNC application 714, certificate holder 906, certificate holder relay server 914, lookup service 904, message generator 908, and/or certificate retriever 902, and/or each of the components described therein, and flowcharts 300, 500, and/or 800. The description of computing device 1100 provided herein is provided for purposes of illustration, and is not intended to be limiting. Embodiments may be implemented in further types of computer systems, as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1130, one or more application programs 1132, other programs 1134, and program data 1136. Application programs 1132 or other programs 1134 may include, for example, computer program logic (e.g., computer program code or instructions) for implementing the systems and methods described above, including the embodiments described above with reference to FIGS. 1-9.

A user may enter commands and information into the computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

As used herein, the terms "computer program medium," "computer-readable medium," and "computer-readable storage medium" are used to generally refer to physical hardware media such as the hard disk associated with hard disk drive 1114, removable magnetic disk 1118, removable optical disk 1122, other physical hardware media such as RAMs, ROMs, flash memory cards, digital video disks, zip disks, MEMs, nanotechnology-based storage devices, solid state drives, and further types of physical/tangible hardware storage media (including system memory 1104 of FIG. 11). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1152, or any other interface type. Such computer programs, when executed or loaded by an application, enable computing device 1100 to implement features of embodiments discussed herein. Accordingly, such computer programs represent controllers of the computing device 1100.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A method in a server for associating a digital certificate with a phone number associated with a client is described herein. The method comprises: receiving a request from the client for a signed digital certificate, the request specifying the phone number associated with the client; determining a phone number verification process from a plurality of phone number verification processes based on the request; providing, to the client, a phone number verification request in accordance with the determined phone number verification process, the phone number verification request specifying a first verification code; responsive to receiving a second verification code, determining whether the second verification code matches the first verification code; and in response to determining that the second verification code matches the first verification code, providing the signed digital certificate to the client.

In one embodiment of the foregoing method, the method further comprises in response to determining that the second verification code does not match the first verification code or in response to determining that no second verification code is received, denying the request for the signed digital certificate.

In one embodiment of the foregoing method, the method further comprises: in response to determining that the second verification code matches the first verification code: generating and signing the digital certificate; and providing the signed, digital certificate to a lookup service that enables the signed, digital certificate to be searchable and retrievable by a plurality of requesting entities.

In one embodiment of the foregoing method, the signed, digital certificate comprises at least one of the phone number associated with the client or a uniform resource identifier associated with a relay server.

In one embodiment of the foregoing method, the plurality of different phone number verification processes comprises a short message service (SMS)-based verification process, and said providing the phone number verification request comprises: providing, to the client, the phone number verification request as an SMS-based text message comprising the first verification code via a first communication channel; and receiving the second verification code via a second communication channel that is different than the first communication channel.

In one embodiment of the foregoing method, the plurality of different phone number verification processes comprises an audio code-based verification process, and said providing the phone number verification request comprises: initiating, via a first communication channel, a telephonic communication session with the client; responsive to the telephonic communication session being accepted, providing the first verification code as an auditory code via the telephonic communication session; and receiving the second verification code via a second communication channel that is different than the first communication channel.

In one embodiment of the foregoing method, the auditory code is in accordance with a dual-tone multi-frequency form.

In one embodiment of the foregoing method, the request further specifies the phone number verification process.

A method implemented by a client associated with a call recipient is also described herein. The method comprises: extracting a phone number from an incoming phone call; querying a server for a pending message that is intended for the call recipient; responsive to receiving the pending message, determining whether the extracted phone number matches a phone number included in the message; in response to determining that the extracted phone number matches the phone number included in the message, causing a first notification to be outputted by the client specifying that the incoming phone call is from a legitimate caller; and responsive to receiving no message or in response to determining that the extracted phone number does not match the phone number included in the message, determining whether the incoming phone call is from an illegitimate caller.

In one embodiment of the foregoing method, said determining whether the incoming phone call is from an illegitimate caller comprises: providing a verification message to a relay server based on a uniform resource identifier specifying the relay server, the verification message inquiring whether the incoming phone call originated from the extracted phone number; responsive to receiving a response to the verification message specifying that the incoming phone call originated from the extracted phone number, causing the first notification to be outputted by the client; and responsive to receiving a response to the verification message specifying that the incoming phone call did not originate from the extracted phone number, causing a second notification to be outputted by the client specifying that the incoming phone call is from an illegitimate caller.

In one embodiment of the foregoing method, the uniform resource identifier is included in a digital certificate associated with the extracted phone number.

In one embodiment of the foregoing method, the verification message comprises a digital signature that authenticates the identity of the call recipient, and the signed digital certificate comprises a phone number of the call recipient.

In one embodiment of the foregoing method, the signed digital certificate further comprises a uniform resource identifier specifying a relay server that is associated with the call recipient.

In one embodiment of the foregoing method, the response to the verification message is received from the relay server associated with the call recipient.

In one embodiment of the foregoing method, at least one of the first notification or the second notification comprises at least one of: a visual indicator outputted via a display screen associated with the client; or an audio indicator outputted via a speaker associated with the client.

A computing device is further described herein. The computing device includes: at least one processor circuit; and at least one memory that stores program code configured to perform a method when executed by the at least one processor circuit. The method includes: extracting a phone number from an incoming phone call; querying a server for a pending message that is intended for a call recipient associated with the computing device; responsive to receiving the pending message, determining whether the extracted phone number matches a phone number included in the message; in response to determining that the extracted phone number matches the phone number included in the message, causing a first notification to be outputted by the computing device specifying that the incoming phone call is from a legitimate caller; and responsive to receiving no message or in response to determining that the extracted phone number does not match the phone number included in the message, determining whether the incoming phone call is from an illegitimate caller.

In one embodiment of the foregoing computing device, said determining whether the incoming phone call is from an illegitimate caller comprises: providing a verification message to a relay server based on a uniform resource identifier specifying the relay server, the verification message inquiring whether the incoming phone call originated from the extracted phone number; responsive to receiving a response to the verification message specifying that the incoming phone call originated from the extracted phone number, causing the first notification to be outputted by the computing device; and responsive to receiving a response to the verification message specifying that the incoming phone call did not originate from the extracted phone number, causing a second notification to be outputted by the computing device specifying that the incoming phone call is from an illegitimate caller.

In one embodiment of the foregoing computing device, the uniform resource identifier is included in a digital certificate associated with the extracted phone number.

In one embodiment of the foregoing computing device, the verification message comprises a digital signature that authenticates the identity of the call recipient, and the signed digital certificate comprises a phone number of the call recipient.

In one embodiment of the foregoing computing device, the signed digital certificate further comprises a uniform resource identifier specifying a relay server that is associated with the call recipient.

V. Conclusion

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A method in a server for associating a digital certificate with a phone number associated with a first client, the method comprising:
receiving a request from the first client for a signed digital certificate, the request specifying the phone number associated with the first client and a uniform resource identifier (URI) of a relay server;
determining to utilize a first phone number verification process from a plurality of phone number verification processes based at least on the request;
providing, to the first client, a phone number verification request in accordance with the first phone number verification process, the phone number verification request specifying a first verification code;
responsive to receiving a second verification code, determining whether the second verification code matches the first verification code;
in response to determining that the second verification code matches the first verification code;
causing generation of a signed digital certificate comprising the URI of the relay server, and causing a lookup service to store the signed digital certificate in association with the first client; and
causing a second client to:
obtain the signed digital certificate from the lookup service, and
utilize the signed digital certificate to determine the URI of the relay server and send a message to the first client via at least the relay server, wherein the utilization of the signed digital certificate prevents the relay server from decrypting the message.

2. The method of claim 1, further comprising:
in response to determining that the second verification code does not match the first verification code or in response to determining that no second verification code is received, denying the request for the signed digital certificate.

3. The method of claim 1, wherein the lookup service enables the signed digital certificate to be searchable and retrievable by a plurality of requesting entities, the plurality of requesting entities comprising the second client.

4. The method of claim 3, wherein the signed digital certificate further comprises the phone number associated with the first client.

5. The method of claim 1, wherein the first phone number verification process comprises a short message service (SMS)-based verification process, and wherein said providing the phone number verification request comprises:
providing, to the first client, the phone number verification request as an SMS-based text message comprising the first verification code via a first communication channel; and
receiving the second verification code via a second communication channel that is different than the first communication channel.

6. The method of claim 1, wherein the first phone number verification process comprises an audio code-based verification process, and wherein said providing the phone number verification request comprises:
  initiating, via a first communication channel, a telephonic communication session with the first client;
  responsive to the telephonic communication session being accepted, providing the first verification code as an auditory code via the telephonic communication session; and
  receiving the second verification code via a second communication channel that is different than the first communication channel.

7. The method of claim 6, wherein the request for the signed digital certificate further specifies the first phone number verification process.

8. The method of claim 1, wherein the server is associated with one or more URIs comprising a first URI and a second URI, the request for the signed digital certificate received via the first URI, the method further comprising:
  receiving, via the second URI, another request from the first client for the signed digital certificate, the another request specifying the phone number associated with the first client;
  determining to utilize a second phone number verification process from the plurality of phone number verification processes based at least on a mapping of the second URI to the second phone number verification process, the second phone number verification process different from the first phone number verification process; and
  providing, to the first client, another phone number verification request in accordance with the second phone number verification process.

9. A computing device for associating a digital certificate with a phone number associated with a first client, comprising:
  at least one processor circuit; and
  at least one memory that stores program code configured to perform a method when executed by the at least one processor circuit, the method comprising:
  receiving a request from the first client for a signed digital certificate, the request specifying the phone number associated with the first client;
  determining a phone number verification process from a plurality of phone number verification processes based on the request;
  providing, to the first client, a phone number verification request in accordance with the determined phone number verification process, the phone number verification request specifying a first verification code;
  responsive to receiving a second verification code, determining whether the second verification code matches the first verification code;
  in response to determining that the second verification code matches the first verification code, providing the signed digital certificate to the first client, the signed digital certificate comprising a uniform resource identifier (URI) associated with a relay server configured to send messages between the first client and another device;
  causing a lookup service to store the signed digital certificate in association with the first client; and
  causing a second client to:
  obtain the signed digital certificate from the lookup service, and
  utilize the signed digital certificate to send an encrypted message to the first client via at least the relay server, wherein utilization of the signed digital certificate prevents the relay server from decrypting the encrypted message.

10. The computing device of claim 9, the method further comprising:
  in response to determining that the second verification code does not match the first verification code or in response to determining that no second verification code is received, denying the request for the signed digital certificate.

11. The computing device of claim 9, wherein the lookup service that enables the signed digital certificate to be searchable and retrievable by a plurality of requesting entities, the plurality of requesting entities comprising the second client.

12. The computing device of claim 11, wherein the signed digital certificate further comprises the phone number associated with the first client.

13. The computing device of claim 9, wherein the phone number verification process comprises a short message service (SMS)-based verification process, and wherein said providing the phone number verification request comprises:
  providing, to the first client, the phone number verification request as an SMS-based text message comprising the first verification code via a first communication channel; and
  receiving the second verification code via a second communication channel that is different than the first communication channel.

14. The computing device of claim 9, wherein the phone number verification process comprises an audio code-based verification process, and wherein said providing the phone number verification request comprises:
  initiating, via a first communication channel, a telephonic communication session with the first client;
  responsive to the telephonic communication session being accepted, providing the first verification code as an auditory code via the telephonic communication session; and
  receiving the second verification code via a second communication channel that is different than the first communication channel.

15. The computing device of claim 14, wherein the request for the signed digital certificate further specifies the phone number verification process.

16. A computer-readable storage medium having program instructions recorded thereon that, when executed by at least one processor, perform a method for associating a digital certificate with a phone number associated with a client, the method comprising:
  receiving a request from the client for a signed digital certificate, the request specifying the phone number associated with the client;
  determining a phone number verification process from a plurality of phone number verification processes based on the request;
  providing, to the client, a phone number verification request in accordance with the determined phone number verification process, the phone number verification request specifying a first verification code;
  responsive to receiving a second verification code, determining whether the second verification code matches the first verification code;
  in response to determining that the second verification code matches the first verification code:
  generating the digital certificate, the digital certificate comprising a uniform resource identifier (URI) associated with a relay server configured to send messages between the client and another device, signing the digital certificate, and causing a lookup service to store the signed digital certificate in association with the phone number associated with the client, the lookup service configured to enable the signed digital certificate to be searchable based at least on the phone number associated with the client and retrievable by a requesting entity, the lookup service executing on a server separate from a client device associated with the client and corresponding to the phone number; and causing the requesting entity to:

obtain the signed digital certificate from the lookup service based at least on the phone number associated with the client, and utilize the signed digital certificate to send a message to the client via the relay server, wherein the utilization of the signed digital certificate prevents the relay server from decrypting the message.

17. The computer-readable storage medium of claim 16, the method further comprising:

in response to determining that the second verification code does not match the first verification code or in response to determining that no second verification code is received, denying the request for the signed digital certificate.

18. The computer-readable storage medium of claim 16, wherein the phone number verification process comprises a short message service (SMS)-based verification process, and wherein said providing the phone number verification request comprises:

providing, to the client, the phone number verification request as an SMS-based text message comprising the first verification code via a first communication channel; and receiving the second verification code via a second communication channel that is different than the first communication channel.

19. The computer-readable storage medium of claim 16, wherein the phone number verification process comprises an audio code-based verification process, and wherein said providing the phone number verification request comprises:

initiating, via a first communication channel, a telephonic communication session with the client;

responsive to the telephonic communication session being accepted, providing the first verification code as an auditory code via the telephonic communication session; and receiving the second verification code via a second communication channel that is different than the first communication channel.

20. The computer-readable storage medium of claim 19, wherein the request for the signed digital certificate further specifies the phone number verification process.

\* \* \* \* \*

UNITED STATES PATENT AND TRADEMARK OFFICE
CERTIFICATE OF CORRECTION

PATENT NO. : 12,457,207 B2
APPLICATION NO. : 17/847939
DATED : October 28, 2025
INVENTOR(S) : Benjamin Montgomery et al.

Page 1 of 1

It is certified that error appears in the above-identified patent and that said Letters Patent is hereby corrected as shown below:

In the Claims

In Column 32, Line 29, in Claim 1, delete "code;" and insert -- code: --.

Signed and Sealed this
Twenty-third Day of December, 2025

John A. Squires
*Director of the United States Patent and Trademark Office*